United States Patent
Gentry et al.

(10) Patent No.: US 10,985,904 B2
(45) Date of Patent: Apr. 20, 2021

(54) COMPRESSIBLE (F)HE WITH APPLICATIONS TO PIR

(71) Applicant: International Business Machines Corporation, Armonk, NY (US)

(72) Inventors: Craig B. Gentry, Hawthorne, NY (US); Shai Halevi, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/444,540

(22) Filed: Jun. 18, 2019

(65) Prior Publication Data

US 2020/0403781 A1 Dec. 24, 2020

(51) Int. Cl.
*H04L 9/00* (2006.01)
*G06F 21/60* (2013.01)
*H04L 9/06* (2006.01)
*G06N 20/00* (2019.01)
*H04L 9/08* (2006.01)

(52) U.S. Cl.
CPC ............ *H04L 9/008* (2013.01); *G06F 21/602* (2013.01); *H04L 9/0618* (2013.01); *G06N 20/00* (2019.01); *H04L 9/088* (2013.01)

(58) Field of Classification Search
CPC ...... H04L 9/008; H04L 9/0618; G06F 21/602
See application file for complete search history.

(56) References Cited

U.S. PATENT DOCUMENTS

| 2016/0321654 | A1 | 11/2016 | Lesavich et al. |
| 2016/0344557 | A1 | 11/2016 | Chabanne et al. |
| 2018/0212750 | A1* | 7/2018 | Hoffstein ............... G06F 17/16 |

(Continued)

FOREIGN PATENT DOCUMENTS

WO 2016048775 A1 3/2016

OTHER PUBLICATIONS

Yi, Xun, et al., "Single-Database Private Information Retrieval from Fully Homomorphic Encryption", IEEE Transactions on Knowledge and Data Engineering, vol. 25, No. 5, May 2013, pp. 1125-1134.

(Continued)

*Primary Examiner* — Huan V Doan
(74) *Attorney, Agent, or Firm* — Harrington & Smith

(57) ABSTRACT

A request is received for specific information that can be determined using data in a database on a first computer system. Either at least some of the data is encrypted or the request is encrypted. The first computer system does not have a decryption key to decrypt the encrypted data or request. The first computer system performs compressible HE operations on the data to determine compressed ciphertext(s) that correspond to the specific information. The operations include using a first uncompressed HE scheme and a second compressed HE scheme. The first HE scheme is used on the data to create other multiple ciphertexts and the second HE scheme is used on the other multiple ciphertexts to pack the other multiple ciphertexts into fewer ciphertexts that are compressed. Both the HE schemes use a same secret key. The first computer system sends a response including compressed ciphertext(s) corresponding to the specific information.

21 Claims, 5 Drawing Sheets

(56) References Cited

U.S. PATENT DOCUMENTS

2018/0212757 A1* 7/2018 Carr .................. H04L 9/008

OTHER PUBLICATIONS

Gentry, Craig, et al., "Compressible FHE with Applications to PIR", IACR, International Association for Cryptologic Research, vol. 20190620:115402, Jun. 20 2019, pp. 1-24.
International Search Report dated Jul. 15, 2020, PCT/EP/2020/066490, 16 pgs.
Aguilar-Melchor, Carlos, et al.
Smart, N.P., et al., "Fully Homomorphic SIMD Operations", F. Des. Codes Cryptogr. (2014) 71:57.
List of IBM Patents and Patent Applications Treated as Related, Jun. 2019, 2 pgs.
Craig Gentry, Shai Halevi, and Nigel Smart. Homomorphic evaluation of the AES circuit. In "Advances in Cryptology—CRYPTO 2012", vol. 7417 of Lecture Notes in Computer Science, pp. 850-867. Springer, 2012. Full version at http://eprint.iacr.org/2012/099.
Craig Gentry and Shai Halevi. Fully homomorphic encryption without squashing using depth-3 arithmetic circuits. In Foundations of Computer Science (FOCS), 2011 IEEE 52nd Annual Symposium on, pp. 107-109. IEEE, 2011.
Craig Gentry and Shai Halevi. Implementing gentry's fully-homomorphic encryption scheme. In Advances in Cryptology—EUROCRYPT'11, vol. 6632 of Lecture Notes in Computer Science, pp. 129-148. Springer, 2011.
Craig Gentry, Amit Sahai, and Brent Waters. Homomorphic encryption from learning with errors: Conceptually-simpler, asymptotically-faster, attribute-based. In Ran Canetti and Juan A. Garay, editors, Advances in Cryptology—CRYPTO 2013, Part I, pp. 75-92. Springer, 2013.
Craig Gentry. How to compress rabin ciphertexts and signatures (and more). In Annual International Crypogytol Conference, pp. 179-200. Springer, 2004.
Craig Gentry. Fully homomorphic encryption using ideal lattices. In Proceedings of the 41st ACM Symposium on Theory of Computing—STOC 2009, pp. 169-178. ACM, 2009.
Ran Gilad-Bachrach, Nathan Dowlin, Kim Laine, Kristin E. Lauter, Michael Naehrig, and John Wernsing. Cryptonets: Applying neural networks to encrypted data with high throughput and accuracy. In ICML, vol. 48 of JMLR Workshop and Conference Proceedings, pp. 201-210. JMLR.org, 2016.
Matthew Green, Susan Hohenberger, and Brent Waters. Outsourcing the decryption of ABE ciphertexts. In 20th Usenix Security Symposium, San Francisco, CA, USA, Aug. 8-12, 2011, Proceedings. USENIX Association, 2011.
Shai Halevi and Victor Shoup. Algorithms in HElib. In CRYPTO (1), vol. 8616 of Lecture Notes in Computer Science, pp. 554-571. Springer, 2014.
Shai Halevi and Victor Shoup. Bootstrapping for HElib. In EUROCRYPT (1), vol. 9056 of Lecture Notes in Computer Science, pp. 641-670. Springer, 2015.
Shai Halevi and Victor Shoup. HElib—An Implementation of homomorphic encryption. https://github.com/shaih/HElibi, Accessed Sep. 2014.
Shai Halevi. Homomorphic encryption. In Tutorials on the Foundations of Cryptography, pp. 219-276. Springer International Publishing, 2017.
Ryo Hiromasa, Masayuki Abe, and Tatsuaki Okamoto. Packing messages and optimizing bootstrapping in gsw-fhe. IEICE Transactions on Fundamentals of Electronics, Communications and Computer Sciences, 99(1):73-82, 2016.
Yuval Ishai and Anat Paskin. Evaluating branching programs on encrypted data. In Theory of Cryptography Conference, pp. 575-594. Springer, 2007.
Alhassan Khedr, P. Glenn Gulak, and Vinod Vaikuntanathan. SHIELD: scalable homomorphic implementation of encrypted data-classifiers. IEEE Trans. Computers, 65(9):2848-2858, 2016.
Aggelos Kiayias, Nikos Leonardos, Helger Lipmaa, Kateryna Pavlyk, and Qiang Tang. Optimal rate private information retrieval from homomorphic encryption. Proceedings on Privacy Enhancing Technologies, 2015(2):222-243, 2015.
Miran Kim, Yongsoo Song, Shuang Wang, Yuhou Xia, and Xiaogian Jiang. Secure Logistic regression based on homomorphic encryption. Cryptology ePrint Archive, Report 2018/074, 2018. https://eprint.iacr.org/2018/074.
Demijan Klinc, Carmit Hazay, Ashish Jagmohan, Hugo Krawczyk, and Tal Rabin. On compression of data encrypted with block ciphers. arXiv:1009.1759 [cs.IT].
Eyal Kushilevitz and Rafail Ostrovsky. Replication is not needed: Single database, computationally-private information retrieval. In Foundations of Computer Science, 1997. Proceedings., 38th Annual Symposium on, pp. 364-373. IEEE, 1997.
Jung Hee Cheon, Jean-Sébastien Coron, Jinsu Kim, Moon Sung Lee, Tancrède Lepoint, Mehdi Tibouchi, and Aaram Yun. Batch fully homomorphic encryption over the integers. In Advances in Cryptology—EUROCRYPT 2013, 32nd Annual International Conference on the Theory and Applications of Cryptographic Techniques, Athens, Greece, May 26-30, 2013. Proceedings, pp. 315-335, 2013.
Jung Hee Cheon, Andrey Kim, Miran Kim, and Yong Soo Song. Homomorphic encryption for arithmetic of approximate numbers. In ASIACRYPT (1), vol. 10624 of Lecture Notes in Computer Science, pp. 409-437. Springer, 2017.
Jung Hee Cheon, Miran Kim, and Myungsun Kim. Search-and-compute on encrypted data. In International Conference on Financial Cryptography and Data Security, pp. 142-159. Springer, 2015.
Ilaria Chillotti, Nicolas Gama, Mariya Georgieva, and Malika Izabachène. Improving TFHE: faster packed homomorphic operations and efficient circuit bootstrapping. In ASIACRYPT (1), vol. 10624 of Lecture Notes in Computer Science, pp. 377-408. Springer, 2017.
Benny Chor, Oded Goldreich, Eyal Kushilevitz, and Madhu Sudan. Private information retrieval. Journal of the ACM (JACM) JACM, vol. 45 Issue 6, Nov. 1998, pp. 965-981.
Jean-Sébastien Coron, Tancrède Lepoint, and Mehdi Tibouchi. Scale-invariant fully homomorphic encryption over the integers. In Public-Key Cryptography—PKC'14, vol. 8383 of Lecture Notes in Computer Science, pp. 311-328. Springer, 2014.
Jean-Sébastien Coron, David Naccache, and Mehdi Tibouchi. Public key compression and modulus switching for fully homomorphic encryption over the integers. In Advances in Cryptology—EUROCRYPT 2012—31st Annual International Conference on the Theory and Applications of Cryptographic Techniques, Cambridge, UK, Apr. 15-19, 2012. Proceedings, pp. 446-464, 2012.
Anamaria Costache, Nigel P. Smart, Srinivas Vivek, and Adrian Waller. Fixed-point arithmetic in SHE schemes. In SAC, vol. 10532 of Lecture Notes in Computer Science, pp. 401-422. Springer, 2016.
Jack L.H. Crawford, Craig Gentry, Shai Halevi, Daniel Platt, and Victor Shoup. Doing real work with fhe: The case of logistic regression. Cryptology ePrint Archive, Report 2018/202, 2018. https://eprint.iacr.org/2018/202.
Crypto++ 5.6.0, pentium 4 benchmarks. https://www.cryptopp.com/benchmarks-p4.html, accessed Feb. 2019, 2009.
Ivan Damgård and Mads Junk. A generalisation, a simplification and some applications of paillier's probabilistic public-key system. In International Workshop on Public Key Cryptography, pp. 119-136. Springer, 2001.
Whitfield Diffie and Martin Hellman. New directions in cryptography. IEEE transactions on Information Theory, 22(6):644-654, 1976.
Léo Ducas and Daniele Micciancio. FHEW: bootstrapping homomorphic encryption in less than a second. In EUROCRYPT (1), vol. 9056 of Lecture Notes in Computer Science, pp. 617-640. Springer, 2015.
Steven D Galbraith and Xibin Lin. Computing pairings using x-coordinates only. Designs, Codes and Cryptography, 50(3):305-324, 2009.

(56) References Cited

OTHER PUBLICATIONS

Nicholas Genise, Craig Gentry, Shai Halevi, Baiyu Li, and Daniele Micciancio. Homomorphic encryption for finite automata. Cryptology ePrint Archive, Report 2019/176,2019. https://eprint.iacr.org/2019/176.

Craig Gentry, Shai Halevi, Charanjit S. Jutla, and Mariana Raykova. Private database access with he-over-oram architecture. In ACNS, vol. 9092 of Lecture Notes in Computer Science, pp. 172-191. Springer, 2015.

Craig Gentry, Shai Halevi, Chris Peikert, and Nigel P. Smart. Field switching in BGV-style homomorphic encryption. Journal of Computer Security, 21(5):663-684, 2013.

Craig Gentry, Shai Halevi, and Nigel P. Smart. Better bootstrapping in fully homomorphic encryption. In Public Key Cryptography—PKC 2012, vol. 7293 of Lecture Notes in Computer Science, pp. 1-16. Springer, 2012.

Craig Gentry, Shai Halevi, and Nigel Smart. Fully homomorphic encryption with polylog overhead. In "Advances in Cryptology—EUROCRYPT 2012", vol. 7237 of Lecture Notes in Computer Science, pp. 465-482. Springer, 2012. Full version at http://eprint.iacr.org/2011/566.

Julian D. Laderman. A noncommutative algorithm for multiplying matrices using 23 multiplications. Bull. Amer. Math. Soc., 82(1):126-128, 01 1976.

Helger Lipmaa and Kateryna Pavlyk. A simpler rate-optimal cpir protocol. In International Conference on Financial Cryptography and Data Security, pp. 621-638. Springer, 2017.

Adriana López-Alt, Eran Tromer, and Vinod Vaikuntanathan. On-the-fly multiparty computation on the cloud via multikey fully homomorphic encryption. In STOC, pp. 1219-1234, 2012.

Vadim Lyubashevsky, Chris Peikert, and Oded Regev. On ideal lattices and learning with errors over rings. J. ACM, 60(6):43, 2013. Early version in EUROCRYPT 2010.

Vadim Lyubashevsky, Chris Peikert, and Oded Regev. A toolkit for ring-LWE cryptography. In Thomas Johansson and Phong Q. Nguyen, editors, Advances in Cryptology—EUROCRYPT 2013, pp. 35-54. Springer, 2013.

Daniele Micciancio and Chris Peikert. Trapdoors for lattices: Simpler, tighter, faster, smaller. In EUROCRYPT, vol. 7237 of Lecture Notes in Computer Science, pp. 700-718. Springer, 2012.

Payman Mohassel and Yupeng Zhang. Secureml: A system for scalable privacy-preserving machine learning. In 2017 IEEE Symposium on Security and Privacy, SP 2017, San Jose, CA, USA, May 22-26, 2017, pp. 19-38. IEEE Computer Society, 2017.

Michael Naehrig, Kristin Lauter, and Vinod Vaikuntanathan. Can homomorphic encryption be practical? In Proceedings of the 3rd ACM workshop on Cloud computing security workshop, pp. 113-124. ACM, 2011.

Femi Olumofin and Ian Goldberg. Revisiting the computational practicality of private information retrieval. In International Conference on Financial Cryptography and Data Security, pp. 158-172. Springer, 2011.

Emmanuela Orsini, Joop van de Pol, and Nigel P. Smart. Bootstrapping BGV ciphertexts with a wider choice of p and q. Cryptology ePrint Archive, Report 2014/408, 2014. http://eprint.iacr.org/.

Pascal Paillier. Public-key cryptosystems based on composite degree residuosity classes. In International Conference on the Theory and Applications of Cryptographic Techniques, pp. 223-238. Springer, 1999.

Chris Peikert, Vinod Vaikuntanathan, and Brent Waters. A framework for efficient and composable oblivious transfer. In Advances in Cryptology—CRYPTO 2008, vol. 5157 of Lecture Notes in Computer Science, pp. 554-571. Springer, 2008.

Oded Regev. On lattices, learning with errors, random linear codes, and cryptography. J. ACM, 56(6):34:1-34:40, 2009.

Ronald L Rivest, Adi Shamir, and Leonard Adleman. A method for obtaining digital signatures and public-key cryptosystems. Communications of the ACM, 21(2):120-126, 1978.

R. Rivest, L. Adleman, and M. Dertouzos. On data banks and privacy homomorphisms. In Foundations of Secure Computation, pp. 169-177. Academic Press, 1978.

Kurt Rohloff and David B. Cousins. A scalable implementation of fully homomorphic encryption built on NTRU. 2nd Workshop on Applied Homomorphic Cryptography and Encrypted Computing, WAHC'14, 2014. Available at https://www.dcsec.uni-hannover.de/fileadmin/ful/mitarbeiter/brenner/wahc14_RC.pdf, accessed Sep. 2014.

Markku-Juhani Olavi Saarinen. Ring-lwe ciphertext compression and error correction: Tools for lightweight post-quantum cryptography. In Proceedings of the 3rd ACM International Workshop on IoT Privacy, Trust, and Security, pp. 15-22. ACM, 2017.

Patrick Schmid and Achim Roos. "aes-ni performance analyzed; limited to 32nm core i5 cpus". https://www.tomshardware.com/reviews/clarkdale-aes-ni-encryption,2538.html, accessed Feb. 2019, 2010.

Radu Sion and Bogdan Carbunar. On the practicality of private information retrieval. In Proceedings of the Network and Distributed System Security Symposium, NDSS 2007, San Diego, California, USA, Feb. 28-Mar. 2, 2007, 2007.

Nigel P. Smart and Frederik Vercauteren. Fully homomorphic SIMD operations. Des. Codes Cryptography, 71(1):57-81, 2014. Early verion at http://eprint.iacr.org/2011/133.

Julien P Stern. A new and efficient all-or-nothing disclosure of secrets protocol. In International Conference on the Theory and Application of Cryptology and Information Security, pp. 357-371. Springer, 1998.

Marten van Dijk, Craig Gentry, Shai Halevi, and Vinod Vaikuntanathan. Fully homomorphic encryption over the integers. In Advances in Cryptology—EUROCRYPT 2010, 29th Annual International Conference on the Theory and Applications of Cryptographic Techniques, French Riviera, May 30-Jun. 3, 2010. Proceedings, pp. 24-43, 2010.

Shuang Wang, Yuchen Zhang, Wenrui Dai, Kristin Lauter, Miran Kim, Yuzhe Tang, Hongkai Xiong, and Xiaoqian Jiang. Healer: homomorphic computation of exact logistic regression for secure rare disease variants analysis in gwas. Bioinformatics, 32(2):211-218, 2016.

Chen Xu, Jingwei Chen, Wenyuan Wu, and Yong Feng. Homomorphically encrypted arithmetic operations over the integer ring. In Feng Bao, Liqun Chen, Robert H. Deng, and Guojun Wang, editors, Information Security Practice and Experience. pages 167-181, Cham, 2016. Springer International Publishing. https://ia.cr/2017/387.

Carlos Aguilar-Melchor, Joris Barrier, Laurent Fousse, and Marc-Olivier Killijian. Xpir: Private information retrieval for everyone. Proceedings on Privacy Enhancing Technologies, 2016(2):155-174, 2016.

Martin Albrecht, Melissa Chase, Hao Chen, Jintai Ding, Shafi Goldwasser, Sergey Gorbunov, Shai Halevi, Jeffrey Hoffstein, Kim Laine, Kristin Lauter, Satya Lokam, Daniele Micciancio, Dustin Moody Travis Morrison, Amit Sahai, and Vinod Vaikuntanathan. Homomorphic encryption standard. Availabale at http://homomorphicencryption.org/, accessed Feb. 2019, Nov. 2018.

Jacob Alperin-Sheriff and Chris Peikert. Practical bootstrapping in quasilinear time. In Ran Canetti and Juan A. Garay, editors, Advances in Cryptology—CRYPTO'13, vol. 8042 of Lecture Notes in Computer Science, pp. 1-20. Springer, 2013.

Jacob Alperin-Sheriff and Chris Peikert. Faster bootstrapping with polynomial error. In Juan A. Garay and Rosario Gennaro, editors, Advances in Cryptology—CRYPTO 2014, Part I, pp. 297-314. Springer, 2014.

Sebastian Angel, Hao Chen, Kim Leine, and Srinath Setty. Pir with compressed queries and amortized query processing. In 2018 IEEE Symposium on Security and Privacy (SP), pp. 962-979. IEEE, 2018.

Yoshinori Aono, Takuya Hayashi, Le Trieu Phong, and Lihua Wang. Privacy-preserving logistic regression with distributed data sources via homomorphic encryption. Ieice Transactions on Information and Systems, E99.D (8):2079-2089, 2016. [00200] [.

Benny Applebaum, David Cash, Chris Peikert, and Amit Sahai. Fast cryptographic primitives and circular-secure encryption based on hard learning problems. In Advances in Cryptology—CRYPTO

(56) References Cited

OTHER PUBLICATIONS 2009, 29th Annual International Cryptology Conference, Santa Barbara, CA, USA, Aug. 16-20, 2009. Proceedings, pp. 595-618, 2009.

Sanjeev Arora and Rong Ge. New algorithms for learning in presence of errors. In ICALP (1), vol. 6755 of Lecture Notes in Computer Science, pp. 403-415. Springer, 2011.

Saikrishna Badrinarayanan, Sanjam Garg, Yuval Ishai, Amit Sahai, and Akshay Wadia. Two-message witness indistinguishability and secure computation in the plain model from new assumptions. In International Conference on the Theory and Application of Cryptology and Information Security, pp. 275-303. Springer, 2017.

Daniel Benarroch, Zvika Brakerski, and Tancrède Lepoint. FHE over the integers: Decomposed and batched in the post-quantum regime. In Public Key Cryptography (2), vol. 10175 of Lecture Notes in Computer Science, pp. 271-301. Springer, 2017.

Elliptic curve point multiplication, en.wikipedia.org/wiki/Elliptic_curve_point_multiplication, downloaded on Jun. 13, 2019.

Dan Boneh, Craig Gentry, Shai Halevi, Frank Wang, and David J. Wu. Private database queries using somewhat homomorphic encryption. In ACNS, vol. 7954 of Lecture Notes in Computer Science, pp. 102-118. Springer, 2013.

Elette Boyle, Yuval Ishai, and Antigoni Polychroniadou. Limits of practical sublinear secure computation. In Annual International Cryptology Conference, pp. 302-332. Springer, 2018.

Zvika Brakerski, Craig Gentry, and Shai Halevi. Packed ciphertexts in LWE-based homomorphic encryption. In Kaoru Kurosawa and Goichiro Hanaoka, editors, Public Key Cryptography, vol. 7778 of Lecture Notes in Computer Science, pp. 1-13. Springer, 2013.

Zvika Brakerski, Craig Gentry, and Vinod Vaikuntanathan. Fully homomorphic encryption without bootstrapping. In Innovations in Theoretical Computer Science (ITCS'12), 2012. Available at http://eprint.iacr.org/2011/277.

Zvika Brakerski and Vinod Vaikuntanathan. Efficient fully homomorphic encryption from (standard) Iwe. SIAM Journal on Computing, 43(2):831-871, 2014.

Zvika Brakerski and Vinod Vaikuntanathan. Lattice-based FHE as secure as PKE. In Moni Naor, editor, Innovations in Theoretical Computer Science, ITCS'14, pp. 1-12. ACM, 2014.

Zvika Brakerski. Fully homomorphic encryption without modulus switching from classical gapsvp. In Reihaneh Safavi-Naini and Ran Canetti, editors, CRYPTO, vol. 7417 of Lecture Notes in Computer Science, pp. 868-886. Springer, 2012.

Hao Chen, Kim Leine, and Rachel Player. Simple encrypted arithmetic library—SEAL v2.1. In Financial Cryptography Workshops, vol. 10323 of Lecture Notes in Computer Science, pp. 3-18. Springer, 2017.

Jingwei Chen, Yong Feng, Yang Liu, and Wenyuan Wu. Faster binary arithmetic operations on encrypted integers. In WCSE'17, Proceedings of 2017 the 7th International Workshop on Computer Science and Engineering, 2017.

* cited by examiner

COMPRESSIBLE (F)HE WITH APPLICATIONS TO PIR

BACKGROUND

This invention relates generally to homomorphic encryption (HE) and, more specifically, relates to compressible homomorphic encryption and fully homomorphic encryption (FHE) with Applications to private information retrieval (PIR).

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

Homomorphic encryption (HE) is a form of encryption that allows computation on ciphertexts (encrypted plaintext), generating an encrypted result which, when decrypted, matches the result of the operations as if those operations had been performed on the plaintext. Those operations are typically referred to as being defined by a circuit. While there are different types of HE, only fully homomorphic encryption (FHE) allows the evaluation of arbitrary circuits of unbounded depth.

FHE (and to some extent other types of HE) allows a service provider to perform operations on encrypted data to determine encrypted results for a query from a user, without being able to decrypt the result or any stored information used to derive the result. This has wide applications, particularly in areas where anonymity is important, such as healthcare.

One application of FHE is therefore private information retrieval (PIR). PIR allows a user to retrieve an item of the user's personal information from a server in possession of a database (e.g., containing health care information) without revealing which item is retrieved. One (e.g., trivial) way to achieve PIR is for the server to send an entire copy of the database to the user. Using modern communication systems, this requires a vast amount of data for any reasonably large database.

FHE would be helpful for PIR, as the service provider would not be privy to the results or to which item is retrieved, as the user's query is encrypted. Current FHE techniques, however, are computationally expensive and impractical for reasonable large databases.

SUMMARY

This section is meant to be exemplary and not meant to be limiting.

In an exemplary embodiment, a method is disclosed that includes receiving, at a first computer system and from a second computer system, a request for specific information that can be determined using data in a database on the first computer system, wherein either at least some of the data is encrypted or the request is encrypted, without the first computer system having a decryption key to decrypt the encrypted data or the encrypted request. The method includes performing by the first computer system compressible homomorphic encryption operations on the data in the database to determine one or more compressed ciphertexts that correspond to the specific information in the database, the compressible homomorphic encryption operations using a first uncompressed homomorphic encryption scheme and a second compressed homomorphic encryption scheme, the performing the compressible homomorphic encryption operations comprising using the first homomorphic encryption scheme on the data to create other multiple ciphertexts and using the second homomorphic encryption scheme on the other multiple ciphertexts to pack the other multiple ciphertexts into fewer ciphertexts that are compressed, wherein both the first and second homomorphic encryption schemes use a same secret key. The method further includes sending, by the first computer system and to the second computer system, a response to the request, the response comprising the one or more compressed ciphertexts corresponding to the specific information that was requested.

An exemplary apparatus includes one or more processors and one or more memories including computer program code. The one or more memories and the computer program code are configured to, with the one or more processors, cause the apparatus to perform operations comprising: receiving, at a first computer system and from a second computer system, a request for specific information that can be determined using data in a database on the first computer system, wherein either at least some of the data is encrypted or the request is encrypted, without the first computer system having a decryption key to decrypt the encrypted data or the encrypted request; performing by the first computer system compressible homomorphic encryption operations on the data in the database to determine one or more compressed ciphertexts that correspond to the specific information in the database, the compressible homomorphic encryption operations using a first uncompressed homomorphic encryption scheme and a second compressed homomorphic encryption scheme, the performing the compressible homomorphic encryption operations comprising using the first homomorphic encryption scheme on the data to create other multiple ciphertexts and using the second homomorphic encryption scheme on the other multiple ciphertexts to pack the other multiple ciphertexts into fewer ciphertexts that are compressed, wherein both the first and second homomorphic encryption schemes use a same secret key; and sending, by the first computer system and to the second computer system, a response to the request, the response comprising the one or more compressed ciphertexts corresponding to the specific information that was requested.

A further exemplary embodiment is a computer program product comprising a computer readable storage medium having program instructions embodied therewith, the program instructions executable by a device to cause the device to perform operations comprising: receiving, at a first computer system and from a second computer system, a request for specific information that can be determined using data in a database on the first computer system, wherein either at least some of the data is encrypted or the request is encrypted, without the first computer system having a decryption key to decrypt the encrypted data or the encrypted request; performing by the first computer system compressible homomorphic encryption operations on the data in the database to determine one or more compressed ciphertexts that correspond to the specific information in the database, the compressible homomorphic encryption operations using a first uncompressed homomorphic encryption scheme and a second compressed homomorphic encryption scheme, the performing the compressible homomorphic encryption operations comprising using the first homomorphic encryption scheme on the data to create other multiple ciphertexts and using the second homomorphic encryption scheme on the other multiple ciphertexts to pack the other multiple ciphertexts into fewer ciphertexts that are compressed, wherein both the first and second homomorphic encryption schemes use a same secret key; and sending, by the first computer system and to the second computer system, a response to the request, the response comprising the one or more compressed ciphertexts corresponding to the specific information that was requested.

In another exemplary embodiment, a method comprises encrypting, for sending to a first computer system and performed at a second computer system, plaintext to create encrypted data and sending the encrypted data from the second computer system to the first computer system, without the first system having a decryption key to decrypt the encrypted data. The method also includes sending by the second computer system a request for specific information that can be determined using the encrypted data. The method includes receiving, at the second computer system and from the first computer system, a response to the request, the response comprising one or more compressed ciphertexts corresponding to the specific information that was requested. The method further includes decrypting by the second computer system the one or more compressed ciphertexts into corresponding plaintext.

An exemplary apparatus includes one or more processors and one or more memories including computer program code. The one or more memories and the computer program code are configured to, with the one or more processors, cause the apparatus to perform operations comprising: encrypting, for sending to a first computer system and performed at a second computer system, plaintext to create encrypted data; sending the encrypted data from the second computer system to the first computer system, without the first system having a decryption key to decrypt the encrypted data; sending by the second computer system a request for specific information that can be determined using the encrypted data; receiving, at the second computer system and from the first computer system, a response to the request, the response comprising one or more compressed ciphertexts corresponding to the specific information that was requested; and decrypting by the second computer system the one or more compressed ciphertexts into corresponding plaintext.

In yet an additional exemplary embodiment, a computer program product comprises a computer readable storage medium having program instructions embodied therewith, the program instructions executable by a device to cause the device to perform operations comprising: encrypting, for sending to a first computer system and performed at a second computer system, plaintext to create encrypted data; sending the encrypted data from the second computer system to the first computer system, without the first system having a decryption key to decrypt the encrypted data; sending by the second computer system a request for specific information that can be determined using the encrypted data; receiving, at the second computer system and from the first computer system, a response to the request, the response comprising one or more compressed ciphertexts corresponding to the specific information that was requested; and decrypting by the second computer system the one or more compressed ciphertexts into corresponding plaintext.

An additional exemplary embodiment is a method comprising receiving, at a first computer system and from a second computer system, a request for a selected entry from a database on the first computer system. The method includes performing by the first computer system a compressible homomorphic encryption scheme on the data in the database to compute an encrypted answer that corresponds to the selected entry in the database, wherein the compressible homomorphic encryption scheme produces the encrypted answer that is not much longer than a corresponding cleartext answer, and computing that encrypted answer takes a few cycles for each byte in the database. The method also includes sending, by the first computer system and to the second computer system, a response to the request, the response comprising the encrypted answer corresponding to the selected entry that was requested.

An exemplary apparatus includes one or more processors and one or more memories including computer program code. The one or more memories and the computer program code are configured to, with the one or more processors, cause the apparatus to perform operations comprising: receiving, at the first computer system and from a second computer system, a request for a selected entry from a database on the first computer system; performing by the first computer system a compressible homomorphic encryption scheme on the data in the database to compute an encrypted answer that corresponds to the selected entry in the database, wherein the compressible homomorphic encryption scheme produces the encrypted answer that is not much longer than a corresponding cleartext answer, and computing that encrypted answer takes a few cycles for each byte in the database; and sending, by the first computer system and to the second computer system, a response to the request, the response comprising the encrypted answer corresponding to the selected entry that was requested.

An additional exemplary embodiment is a computer program product comprising a computer readable storage medium having program instructions embodied therewith, the program instructions executable by a device to cause the device to perform operations comprising: receiving, at the first computer system and from a second computer system, a request for a selected entry from a database on the first computer system; performing by the first computer system a compressible homomorphic encryption scheme on the data in the database to compute an encrypted answer that corresponds to the selected entry in the database, wherein the compressible homomorphic encryption scheme produces the encrypted answer that is not much longer than a corresponding cleartext answer, and computing that encrypted answer takes a few cycles for each byte in the database; and sending, by the first computer system and to the second computer system, a response to the request, the response comprising the encrypted answer corresponding to the selected entry that was requested.

In an exemplary embodiment, a method is disclosed that includes encrypting an index i, to be sent to a first computer system and by a second computer system, of an entry into a database stored by the first computer system, wherein the index i is represented in a mixed radix of $N_D$ bases and the database also has $N_D$ bases. The method includes requesting by the second computer system retrieval of an item from the first computer system using the encrypted index. The method includes receiving, by the second computer system and from the first computer system, a response to the request, the response comprising an encrypted answer, comprising one or more compressed ciphertexts, corresponding to an entry in the database that was requested using the encrypted index. The method also includes decrypting by the second computer system the one or more compressed ciphertexts into corresponding plaintext.

An exemplary apparatus includes one or more processors and one or more memories including computer program code. The one or more memories and the computer program code are configured to, with the one or more processors, cause the apparatus to perform operations comprising: encrypting an index i, to be sent to a first computer system and by a second computer system, of an entry into a database stored by the first computer system, wherein the index i is represented in a mixed radix of $N_D$ bases and the database also has $N_D$ bases; requesting by the second computer system retrieval of an item from the first computer system using the encrypted index; receiving, by the second computer system and from the first computer system, a response to the request, the response comprising an encrypted answer, comprising one or more compressed ciphertexts, corresponding to an entry in the database that was requested using the encrypted index; and decrypting by the second computer system the one or more compressed ciphertexts into corresponding plaintext.

A further exemplary embodiment is a computer program product comprising a computer readable storage medium having program instructions embodied therewith, the program instructions executable by a device to cause the device to perform operations comprising: encrypting an index i, to be sent to a first computer system and by a second computer system, of an entry into a database stored by the first computer system, wherein the index i is represented in a mixed radix of $N_D$ bases and the database also has $N_D$ bases; requesting by the second computer system retrieval of an item from the first computer system using the encrypted index; receiving, by the second computer system and from the first computer system, a response to the request, the response comprising an encrypted answer, comprising one or more compressed ciphertexts, corresponding to an entry in the database that was requested using the encrypted index; and decrypting by the second computer system the one or more compressed ciphertexts into corresponding plaintext.

DETAILED DESCRIPTION

Figure 1:
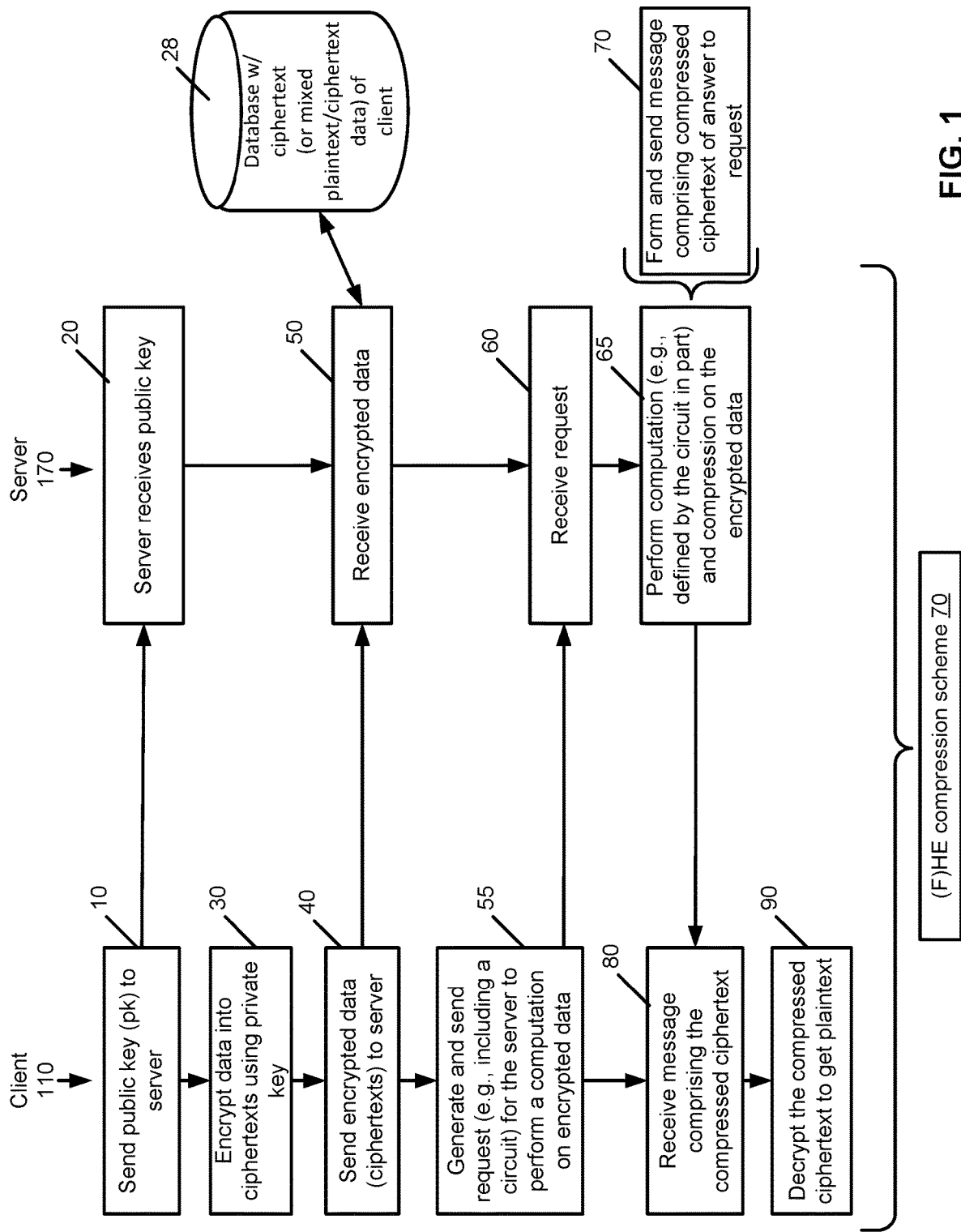
FIG. 1 is a flowchart of an exemplary method for encrypted communication between a user and a server using compressible (F)HE in an exemplary embodiment.

The following abbreviations that may be found in the specification and/or the drawing figures are defined as follows:

| AES | advanced encryption standard |
|---|---|
| AES-CTR | AES Counter Mode |
| CRT | Chinese remainder theorem |
| ctxt | ciphertext |
| FFT | fast Fourier transform |
| HE | homomorphic encryption |
| FHE | fully homomorphic encryption |
| (F)HE | HE OR FHE |
| GSW | (Craig) Gentry, (Amit) Sahai, and (Brent) Waters |
| LWE | learning with errors |
| MPC | multi-party computation |
| PKE | public-key encryption |

-continued

| PIR | private information retrieval |
|---|---|
| RLWE | ring LWE |
| (R)LWE | LWE or RWLE |

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

It is noted that citations to references are located as numbers within brackets (e.g., "[1]" is for reference number one), and are cited below. These references are also submitted in an Information Disclosure Statement.

Homomorphic encryption (HE) is often viewed as impractical, both in communication and computation. Here an additively homomorphic encryption scheme is provided that based on (e.g., ring) LWE with nearly optimal rate (1−ε for any ε>0). Moreover, it is described how to compress many Gentry-Sahai-Waters (GSW) ciphertexts (e.g., ciphertexts that may have come from a homomorphic evaluation) into (fewer) high-rate ciphertexts.

Using an exemplary high-rate HE scheme, a rate-(4/9) single-server private information retrieval (PIR) scheme is built in exemplary embodiments with very low computational overhead. Single-server PIR inherently requires the server to perform at least one operation per database bit. The computation in one exemplary PIR scheme is not so much worse than this inherent lower bound, and is probably less than whole-database AES encryption—namely, about 1.5 mod-q multiplication per database byte, where q is a number of length about 50 to 60 bits. Asymptotically, the computational overhead of this exemplary PIR scheme is Õ(log log λ+log log log N), where λ is the security parameter and N is the number of database files, which are assumed to be sufficiently large.

How bandwidth efficient can (fully) homomorphic encryption ((F)HE) be? While it is easy to encrypt messages with almost no loss in bandwidth, the same is generally not true for homomorphic encryption: Evaluated ciphertexts in contemporary HE schemes tend to be significantly larger than the plaintext that they encrypt, at least by a significant constant factor and often much more.

Beyond the fundamental theoretical interest in the bandwidth limits of FHE, a homomorphic scheme with high rate has several applications. Perhaps the most obvious is for private information retrieval (PIR), where bandwidth is of the essence. While HE can clearly be used to implement PIR, even the best PIR implementation so far (such as [1, 5]) are still quite far from being able to support large databases, mostly because the large expansion factor of contemporary HE schemes. Another application can be found in the work of Badrinarayanan et al. [9], who showed that compressible (additive) homomorphic encryption with rate better than ½ can be used for a high-rate oblivious transfer, which in turn can be used for various purposes in the context of secure computation. Prior to this work the only instantiation of high rate homomorphic encryption was the Damgård-Jurik cryptosystem [31], which however is (a) only additively homomorphic, (b) rather expensive, and (c) insecure against quantum computers.

In this document, this situation is remedied, such that the first compressible fully homomorphic encryption scheme is devised, and it is shown how to use the scheme to get efficient PIR. Namely, in an exemplary embodiment, an (F)HE scheme is described whose evaluated ciphertexts can be publicly compressed until they are roughly the same size as the plaintext that they encrypt while still being decryptable. An exemplary compressible scheme can take the final result of homomorphic evaluations (specifically, under the GSW cryptosystem [43]), and cram it into matrix-encrypting matrix-ciphertexts, where the ratio of the aggregate plaintext size to the aggregate ciphertext size can be $1-\varepsilon$ for any $\varepsilon$ (assuming the aggregate plaintext is sufficiently large, proportional to $1/\varepsilon^3$). The compressed ciphertexts are no longer GSW ciphertexts. However, they still have sufficient structure to allow additive homomorphism, and multiplication on the left by encryption of small scalars, all while remaining compressed. (It is noted that these operations increase the "noisiness" of the ciphertexts somewhat.) Just like GSW, the security of an exemplary scheme is based on the learning with errors assumption [71] or its ring variant [62] (e.g., and a circular security assumption in the case of fully homomorphic encryption).

It is noted that a compressible fully homomorphic encryption easily yields an end-to-end rate-efficient FHE: Freshly encrypted ciphertexts are immediately compressed during encryption, then "decompressed" using bootstrapping before any processing, and finally compressed again before decryption. The resulting scheme has compressed ciphertexts at any time, which are only temporarily expanded while they are being processed. It is also noted that one could even use hybrid encryption, where fresh ciphertexts are generated using, e.g., AES-CTR, and the AES key is sent along encrypted under the FHE.

With respect to applications to PIR, many exemplary optimizations to the basic scheme are described below, yielding a single-server private information retrieval scheme with low communication overhead, while at the same time being computationally efficient. Asymptotically, the computational overhead is $\tilde{O}(\log \log \lambda + \log \log \log N)$, where $\lambda$ is the security parameter and N is the number of database files, which are assumed to be sufficiently large.

It is explained in detail why it is estimated that this exemplary PIR scheme should be not only theoretically efficient but also practically fast. Specifically, one can get a rate 4/9 single-server PIR scheme, in which the server's amortized work is only 1.5 single-precision modular multiplication for every byte in the database. For a comparison point, the trivial PIR solution of sending the entire database will have to at least encrypt the whole database (for communication security), hence incurring a cost of an AES block encryption per 16 database bytes, which is surely more work than what exemplary schemes herein do. Thus, contra Sion-Carbunar [77], PIR is finally more efficient than the trivial solution not only in terms of communication, but also in terms of computation.

Those accustomed to thinking of (R)LWE-based homomorphic encryption as impractical may find the low computational overhead of PIR schemes herein hard to believe. However, RLWE-based HE—in particular, the GSW scheme with exemplary adaptations described herein—really shines in the PIR setting for a few reasons. First, the noise in GSW ciphertexts grows only additively with the degree when the messages multiplied from the left are in $\{0,1\}$. (The receiver's GSW ciphertexts will encrypt the bits of its target index.) Moreover, even though one obviously needs to perform $\Omega(N)$ ciphertext operations for a database with N files, one can ensure that the noise grows only proportionally to log N (so its bit size only grows with log log N). The small noise growth allows an exemplary PIR scheme to use a small RLWE modulus q, not much larger than one would use in a basic RLWE-based PKE scheme. Third, one can exploit the recursive/hierarchical nature of the classic approach to single-server PIR [58, 79] to hide the more expensive steps of RLWE-based homomorphic evaluation, namely polynomial FFTs (and less importantly, CRT lifting). In the classical hierarchical approach to PIR, the computationally dominant step is the first step, where in an exemplary embodiment the effective database size is projected from $N = N_1 \times \ldots \times N_d$ down to $N/N_1$. To maximize the efficiency of this first step, the polynomials of the database may also be preprocessed so that they are already in evaluation representation, thereby avoiding polynomial FFTs and allowing each (log q)-bit block of the database to be "absorbed" into an encrypted query using a small constant number of mod-q multiplications. In the first step, for instance, the server generates $N_1$ ciphertexts from the client's log $N_1$ ciphertexts, which includes FFTs, but their amortized cost is insignificant when $N_1 \ll N$. Therefore, the computational overhead of the first step boils down to just the overhead of multiplying integers modulo q, where q can be quite small. Multiplications modulo q can be made asymptotically faster by having q be a product of primes and using the CRT representation, and multiplication modulo the prime divisors can be accelerated further with a table lookup. After the first step of PIR, GSW-esque homomorphic evaluation requires converting between coefficient and evaluation representation of polynomials, but this will not significantly impact the overhead of this exemplary PIR scheme, as the effective database is already much smaller (at most $N/N_1$), where $N_1 = \tilde{\Theta}(\log N + \lambda)$ is taken.

Concerning ciphertext compression, ciphertext compression has always had obvious appeal in the public-key setting (and even sometimes in the symmetric key context, e.g., [57]). Probably the most well-known ciphertext compression technique is hybrid encryption: a (long) message is encrypted under a symmetric encryption scheme, and only the symmetric decryption key is encrypted under the public-key scheme. Other examples of ciphertext compression are using just the x coordinate of an elliptic curve point [11, 34], and compressing Rabin ciphertexts down to (⅔)log n bits with security based on factoring n (assuming the message has less than ⅔ log n bits of entropy) [44].

Rivest, Adleman and Dertouzos [73] proposed the notion of homomorphic encryption shortly after the invention of public key cryptography [32, 72]. Gentry [45] constructed the first plausibly secure fully homomorphic encryption (FHE) scheme (allowing arbitrary computations on data while encrypted), and there are now FHE schemes with immensely better performance and security guarantees [80, 78, 42, 16, 27, 15, 18, 39, 38, 40, 61, 21, 12, 63, 14, 37, 43, 3, 4, 50, 48, 68, 74, 26, 17, 49, 33, 36, 23, 6, 81, 82, 28, 54, 46, 24, 19, 10, 22, 65, 20, 56, 29].

There has also been a lot of work on improving the rate of FHE and other (R)LWE-based cryptosystems. Some important examples are dimension reduction and modulus reduction [16, 15], through which a ciphertext can be transformed to a lower-dimensional vector with coefficients reduced by a smaller modulus, making the ciphertext smaller and also reducing the complexity of its decryption. (See [75] for additional work in this direction.) Another important direction is "ciphertext packing" [70, 78, 15, 14], where each ciphertext encrypts not one but an array of plaintext elements. In fact, not just the rate but the overhead of an entire FHE computation can be reduced, sometimes to just a polylogarithmic function of the security parameter [39]. Also, some FHE schemes even allow plaintexts to be matrices [70, 14, 52, 35].

There was even work on hybrid encryption in the context of HE [45, 41, 66]: data encrypted under AES can be homomorphically decrypted using an encryption of the AES key under the HE scheme, after which the data can be operated on while encrypted. However, the other direction is impossible (as far as is known). There is no way of transforming an HE ciphertext into an AES ciphertext for the same message without using the secret key. Some prior works included a "post-evaluation" ciphertext compression techniques, such as the work of van Dijk et al. [80] for integer-based HE, and the work of Hohenberger et al. for attribute-based encryption [47]. However, the rate achieved there is still low, and in fact no scheme prior to this work was able to break the rate-½ barrier. (Hence for example no LWE-based scheme could be used for the high-rate OT application of Badrinarayanan et al. [9].)

Regarding the van Dijk et al. [80] scheme specifically as described in that paper, that scheme only encrypts 1 bit per ciphertext. So, if the ciphertext is only as big as an RSA modulus, say 1024 bits, then the ciphertext is 1024 times longer than the plaintext. In general, to obtain decent security, a ciphertext needs to be more than 100 bits, so any scheme that securely encrypts only 1 bit per ciphertext will have rate <1/100.

A longer explanation is as follows. The scheme van Dijk et al. can be tweaked to encrypt more than 1 bit at a time, but it is still not clear how to get very good rate. To understand this, a little more background is necessary on van Dijk. The secret key is some big integer p, and a ciphertext that encrypts a number x modulo n (i.e., a number in $\{0, 1, \ldots, n-1\}$) has the form $c=q_1*p+q_2*n+x$, where the numbers $q_2$ and n are chosen so that the magnitude of $q_2*n+x$ is much smaller than p. Decryption is $x=(c \bmod p) \bmod n$, where (c mod p) reduces the values into the range $\{0, \ldots, p-1\}$, and the mod n reduces that result into $\{0, \ldots, n-1\}$. The ciphertext c is typically many more bits than p, and p is typically many more bits than the plaintext, which is a number in $\{0, \ldots, n-1\}$.

The ciphertext compression technique computes $g^c$ mod N, such that the multiplicative group modulo N has order M (<N), where M is divisible by p. Basically taking $g^c$ preserves the value of (c mod p) and throws away other information about p. So, the issue that the initial c is many more bits than p has been mitigated to some extent.

However, p still needs to be many more bits than n (the plaintext space), and the number N above needs to be substantially many more bits than p (although N does not need to be as many bits as the original c). The reason p needs to be many more bits than n is the usual homomorphic encryption issue: homomorphic operations increase the size of the noise, where the size of the noise here is the magnitude of (c mod p). Even one multiplication will double the number of bits in this magnitude, and yet this magnitude be less than p to allow correct decryption. This implies n has many times fewer bits than p. The number N needs to have at least four times as many bits as p, otherwise it may be possible to factor N, which would break the system. Overall, the compressed ciphertext, which is a number modulo N, has many more bits than the mod-n plaintext space. Therefore, the van Dijk scheme does not provide anywhere near the possible rates described herein.

The only prior cryptosystem with homomorphic properties that is known with rate better than ½ is due to Damgård and Jurik [31]. They described an extension of the Paillier cryptosystem [69] that allows rate-(1−o(1)) encryption with additive homomorphism: In particular, a mod-$N^s$ plaintext can be encrypted inside a mod-$N^{s+1}$ ciphertext for an RSA modulus N and an arbitrary exponent $s \geq 1$.

Regarding private information retrieval (PIR), PIR was introduced in the work of Chor et al. [25]. In this setting a client can obtain the N-th bit (or file) from a database while keeping its target index $i \in [N]$ hidden from the server(s), all with total communication sublinear in N. (The sublinear communication requirement rules out a trivial protocol, where the server transmits the entire database to the client.) Chor et al. provided constructions with multiple servers, and later Kushilevitz and Ostrovsky [58] showed that PIR is possible even with a single server under computational assumptions. Kushilevitz and Ostrovsky described the recursive PIR construction for a database of $N=N_1 \times \ldots N_d$ bits, where in the first step one applies a PIR scheme to the $N/N_1$ $N_1$-element slices of the database in parallel, and then applies PIR to the "new database" of $N/N_1$ PIR responses, and so on. Stern [79] improved the construction with other additively homomorphic encryption schemes. Kiayias et al. [55] (see also [60]) gave the first single-server PIR scheme with rate (1−o(1)), based on Damgård-Jurik [31]. As noted in [55, 1, 60], maximizing the rate is crucial for modern applications of PIR, because individual files may be so huge—think streaming a gigabit movie file from among thousands of movies. However, Damgård-Jurik is computationally too expensive to be used in practice for large-scale PIR [77, 67]. At a minimum, PIR using Damgård-Jurik requires the server to compute a mod-N multiplication per bit of the database, where N has 2048 or more bits. The nested decryption is also quite expensive. The papers [55, 60] expressly call for an underlying encryption scheme to replace Damgård-Jurik to make their rate-optimal PIR schemes computationally less expensive. It should be noted that an exemplary matrix-based version of GSW does allow nesting, where recursively a plaintext becomes a ciphertext at the next level as in the Damgård-Jurik approach to PIR. So, exemplary schemes herein can be used as a replacement to improve the efficiency of their schemes. However, it turns out to be even more efficient to avoid nesting and use GSW's natural homomorphism.

In any single-server PIR protocol, the server's computation must be at least N; otherwise, the server would know that the bits the server did not touch while constructing its response were irrelevant to the query (thereby breaking privacy). This "problem" of PIR is so fundamental, even for multi-server protocols, that Boyle et al. [13] have found that "PIR hardness" is a useful way to split Multi-Party Computation (MPC) problems into those that can have protocols with sublinear computation, and those that cannot (because such a protocol would imply PIR with sublinear computation). Given that many MPC problems are PIR-hard, it becomes crucial to minimize PIR's computational overhead. In terms of computation, the state-of-the-art PIR scheme is XPIR by Aguilar-Melchor et al. [1], with further optimizations in the SealPIR work of Angel et al. [5]. This scheme is based on RLWE and features many clever optimizations, including preprocessing the database into evaluation representation, but the rate diminishes exponentially with the depth of the recursion (losing a factor of five or more with each level), and with too few levels the client's work becomes high. Indeed, Angel et al. commented that even with their optimizations "supporting large databases remains out of reach."

On a high level, exemplary compressible schemes herein combine two cryptosystems: One is a low-rate (uncompressed) FHE scheme, which is a slight variant of GSW [43], and the other is a new high-rate (compressed) additively-homomorphic scheme for matrices, somewhat similar to the matrix homomorphic encryption of Hiromasa et al. [52]. What makes an exemplary scheme herein compressible is that these two cryptosystems "play nice," in the sense that they share the same secret key and one can pack many GSW ciphertexts in a single compressed ciphertext.

The low-rate scheme is almost identical to GSW, except that matrices are used as keys rather than vectors, as done in [70]. Namely an exemplary secret key is a matrix of the form S=[S'|I], and the public key is a pseudorandom matrix P satisfying S×P=E(mod q), with q the LWE modulus and E a low norm matrix. Just as in GSW, the low-rate cryptosystem encrypts small scalars (typically just bits $\sigma \in \{0,1\}$), the ciphertext is a matrix C, and the decryption invariant is SC=σSG+E(mod q) (with G the Micciancio-Peikert gadget matrix [64] and E a low-norm matrix).

An exemplary high-rate scheme herein encrypts a whole matrix modulo q in a single ciphertext matrix, whose dimensions are only slightly larger than the plaintext matrix. A new technical ingredient that is introduced is a different gadget matrix, that is called H: Just like the G gadget matrix in GSW, this exemplary H adds redundancy to the ciphertext, and H has a "public trapdoor" that enables removing the noise upon decryption. The difference is that H is a nearly square matrix, hence comes with almost no expansion, enabling high-rate ciphertexts. In more detail, G has dimensions n×m where m=n log q. For example, if $q=2^{60}$, then m is 60 times bigger than n·H on the other hand will typically have only one more column than rows. It should be noted that an almost rectangular H cannot add much redundancy and hence cannot have a trapdoor of high quality. It is thus made do with a low-quality trapdoor that can only remove a small amount of noise.

The slight increase in dimensions from plaintext to ciphertext in an exemplary scheme comes in two steps. First the special-form secret keys are used to "pad" plaintext matrices M with some additional zero rows, setting $$M' = \begin{bmatrix} 0 \\ M \end{bmatrix}$$

so as to get SM'=M. (Hiromasa et al. used the same special form for the same purpose in [52].) Second, redundancy is added to M' by multiplying this matrix on the right by the gadget matrix H, to enable removing a small amount of noise during decryption. As is known, noise increases for homomorphic operations such as addition and especially multiplication on ciphertexts. The decryption invariant for compressed ciphertexts is SC=M'H+E(mod q). To get a high-rate compressed ciphertexts, an exemplary embodiment ensures that the increase in dimensions from plaintext to ciphertext is as small as possible. With $n_0 \times n_0$ plaintext matrices M, it is needed to add as many zero rows as the dimension of the LWE secret (which is denoted by k). Denoting $n_1 = n_0 + k$, the padded matrix M' has dimension $n_1 \times n_0$. Redundancy is further added by multiplying on the right with a somewhat rectangular gadget matrix H of dimension $n_0 \times n_2$. The final dimension of the ciphertext is $n_1 \times n_2$, so the information rate of compressed ciphertexts is $n_0^2/(n_1 n_2)$.

It is now shown how to orchestrate the various parameters so that one can get $n_0^2/(n_1 n_2) = 1 - \varepsilon$ for any desired $\varepsilon > 0$, using a modulus q of size $n_0^{\Theta(1/\varepsilon)}$. This means that it is possible to support any constant $\varepsilon > 0$ assuming the hardness of LWE with polynomial gap, or even polynomially small $\varepsilon$ if one assumes hardness of LWE with subexponential gap. More details are provided below.

It is remarked that instead of using the new gadget matrix H, redundancy may be added to the ciphertext using the decryption invariant SC=f·M'+E(mod q) for a sufficiently large integer f (e.g., f>1). This variant (described below) has the same asymptotic behavior as the variant that uses H, but its concrete efficiency seems to be somewhat worse but still usable.

As additional overview, the process described below when describing compressible FHE is generally (1) encrypting data in low-rate (uncompressed) ciphertexts, and computing something on the encrypted data, then (2) compressing the result into a high-rate (compressed) ciphertext, and finally (3) decrypting to recover the result. It is noted that, when discussing the compressed (F)HE scheme below, phrases like "adding redundancy to the plaintext" are used, which makes it sound as if the plaintext is being processed in some way, e.g., as in perhaps directly encrypting plaintext into high-rate ciphertexts. While it is true that it is possible to encrypt plaintext directly into compressed ciphertext (and it is even explained how this could be done below), the primary thrust in the description below uses different techniques. In particular the two formulas SC=M'H+E(mod q) (described above and below as a first variant) and SC=f·M'+E(mod q) (described above as another variant) describe the decryption process. One first multiplies the ciphertext C by the secret key S, thus getting either M'H+E(mod q) or f·M'+E(mod q). The term E is some noise that needs to be gotten rid of, and for that one can use the fact that M'H (or f·M') has some redundancy. So, the primary thrust below uses the process (1)-(3) described above, which incorporate the decryption process also just described.

The ideas so far are sufficient to get an asymptotically efficient scheme, and they are described below. Many more concrete tricks may be used to get practical efficiency, however. Specifically an exemplary embodiment may use RLWE rather than LWE for the underlying scheme, preprocess the database to save on FFTs, and apply modulus-switching techniques to get better noise management, these tricks are all described below. Before presenting any of these ideas, however, an overview is provided of an exemplary method and system in the next part of this document and then additional background is described.

Referring to FIG. 1, this figure is a flowchart of an exemplary method for encrypted communication between a client and server using a compressible (F)HE scheme in an exemplary embodiment. This method does not include PIR, although the basic blocks for PIR are included. PIR is described later. Actions taken by a client 110 (e.g., under control of a user) are shown on the left, and actions taken by a server 170 (e.g., as part of a service provider's operations) are shown on the right.

As described in more detail below, there is a compressible (F)HE scheme 70 that comprises the following procedures, described in more detail below: KeyGen, a key generation procedure; Encrypt, which performs homomorphic encryption of plaintext; Evaluate, which performs homomorphic evaluations using a circuit on ciphertexts; Compress, which compress ciphertexts that have been homomorphically evaluated; and Decrypt, which performs decryption of compressed ciphertexts. This scheme may be used in multiple locations in FIG. 1, as described below.

In block 10, the client 110 sends a public key (pk) to the server 170, and the server 170 receives the public key in block 20. In block 30, the client 110 encrypts data using its (e.g., public or private) key of the (F)HE encryption scheme 70, including in particular the use of a gadget matrix or a variant of such, as described below. The client 110, in block 40, sends the encrypted data (e.g., as ciphertexts) to the server, which receives the encrypted data in block 50. The server 170 stores this data in database 20 as ciphertexts. It is also noted that in some embodiments, the database 28 may contain mixed plaintext and ciphertext—or even just plaintext—instead of only ciphertext. Regarding the plaintext in the database 28, an encrypted query, as described below, may be used, and then even a plaintext-only database can be used.

At some point, the client generates (see block 55) an, e.g., encrypted request and query for information stored at the server, where the request and query may be encrypted via the (F)HE scheme 70. The query may be realized as a circuit. Block 55 indicates that the client 110 sends the request and query (e.g., circuit) to the server 170, which receives the same in block 60. In principle, the circuit to be evaluated on the encrypted data can also come from anywhere. For example, one scenario for FHE is that the client encrypts its financial data and sends the encrypted data to an online tax document preparation company (which stores the encrypted data in the database 28), and then the client requests an evaluation of tax liability. The request in this case just tells the company to perform tax evaluation, and may not be encrypted. This company (using server 170) applies its proprietary tax form software (e.g., as a circuit) to the encrypted financial data to obtain the evaluation of tax liability. In this scenario, the circuit is not coming from the client.

Another (alternative or additional) option is that the beginning part of this flow is not necessarily directly between the client 110 and the server 170. For example, it may be the case that a various (e.g., random) party or various parties encrypted data under the client's public key, and this information was eventually collected at the server (together with the client's public key, pk) in the database 28. Later, the client 110 may generate and send (block 55) a request to the server—e.g., to the effect (using a circuit) of "send me all files you have encrypted under my key that contain some keyword"—and the server can respond to this request. In effect, the coordination is happening automatically (because all that is needed is that the client 110 and the server 170 agree on the key being used).

The server 170 performs in block 65 computations (e.g., defined by the circuit in part) of ciphertexts stored in the database 28. At this point, the server 170 has produced an answer as ciphertext to the query. In a typical (F)HE scenario, the resultant ciphertext could be quite large. Using the (F)HE encryption scheme 70 herein, however, substantially reduces the size of the ciphertext by compressing the ciphertext. Thus, block 65 involves the server compressing the ciphertext to create compressed ciphertext.

The server 170 in block 70 forms a message comprising the compressed ciphertext corresponding to the request and query. The server also sends the message (or messages) comprising the compressed ciphertext of the answer to the query. The client 110 receives the message in block 80 of the compressed ciphertext 70 and decrypts in block 90 the compressed ciphertext 70 to get plaintext, e.g., using the (F)HE encryption scheme 70. The client 110 may perform one or more operations with the plaintext, as is known.

Although the computer systems involved in the schemes herein are referred to as client 110 and server 170, there need not be a client/server relationship between these computer systems. For instance, there could be a peer-to-peer relationship instead.

Figure 2:
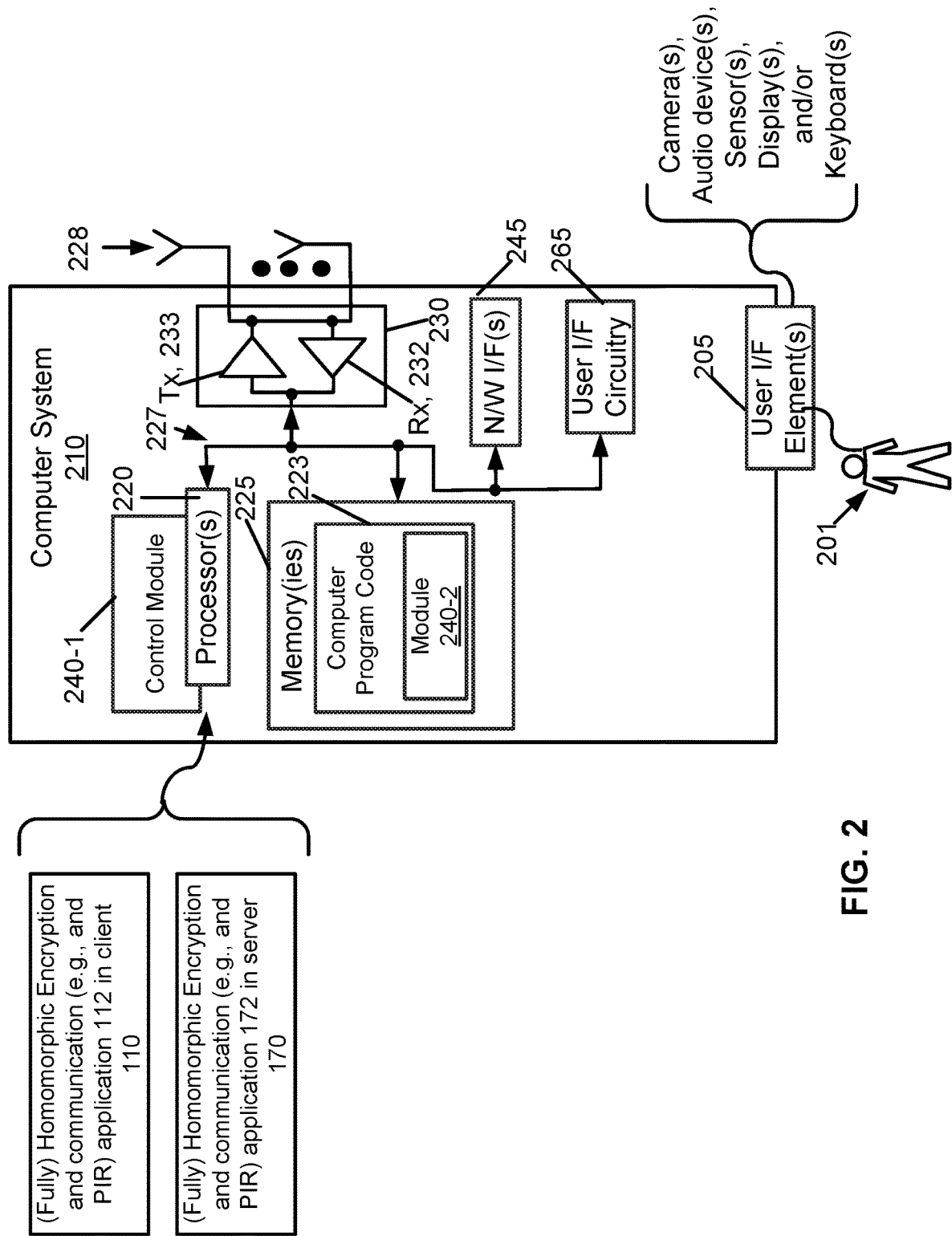
FIG. 2 is a block diagram of an exemplary computer system that may be used in multiple devices from FIG. 1.

Turning to FIG. 2, this figure is a block diagram of an exemplary computer system that may be used in multiple devices from FIG. 1. The computer system 210 includes one or more processors 220, one or more memories 225, one or more transceivers 230, one or more network (N/W) interfaces (I/F(s)) 245, and user interface circuitry 265, interconnected through one or more buses 227. Each of the one or more transceivers 230 includes a receiver, Rx, 232 and a transmitter, Tx, 233. A user 201 may interact with the user interface elements 205. The transceivers may use any applicable protocol, such as wireless fidelity (Wi-Fi), Bluetooth, near field communication (NFC), and/or cellular protocols such as 4G (fourth generation) or 5G (fifth generation). The one or more buses 227 may be address, data, and/or control buses, and may include any interconnection mechanism, such as a series of lines on a motherboard or integrated circuit, fiber optics or other optical communication equipment, and the like. The one or more transceivers 230 are connected to one or more antennas 228. The one or more memories 225 include computer program code 223.

The computer system 210 includes a control module 240, comprising one of or both parts 240-1 and/or 240-2. The control module 240 causes the computer system 210 to perform the operations described above that are performed herein by the individual devices. The control module 240 may be implemented in a number of ways. The control module 240 may be implemented in hardware as control module 240-1, such as being implemented as part of the one or more processors 220. The control module 240-1 may be implemented also as an integrated circuit or through other hardware such as a programmable gate array. In another example, the control module 240 may be implemented as control module 240-2, which is implemented as computer program code 223 and is executed by the one or more processors 220. For instance, the one or more memories 225 and the computer program code 223 may be configured to, with the one or more processors 220, cause the user computer system 210 to perform one or more of the operations as described herein. It should also be noted that the devices shown in the user computer system 210 are not limiting and other, different, or fewer devices may be used. For instance, a wired N/W IF 225 might not be necessary if only wireless networking via one or more transceivers 230 is used instead.

The user interface circuitry 265, which may or may not be implemented, communicates if implemented with one or more user interface elements 205, which may be formed integral with the user computer system 210 and/or be outside the user computer system 210 but coupled to the user computer system 210. The user interface elements 205 include one or more of the following: one or more camera(s); one or more audio device(s) (such as microphone(s), speaker(s), and the like); one or more sensor(s) (such as GPS sensor(s), fingerprint sensor(s), orientation sensor(s), and the like); one or more displays; and/or one or more keyboards. This list is not exhaustive or limiting, and other, different, or fewer elements may be used. A user 201 (e.g., using client 110) can interact with the user interface elements 205 and cause the corresponding computer system 210 to take actions. For instance, the client 110 could be under control in part of the user 201, e.g., to request information from a bank, and the bank controls the server 170, potentially without interaction with a corresponding user 201.

In terms of exemplary implementations for different devices in FIG. 2, the control module 240 can be implemented as one of the following for the computer system 210 of the corresponding device: (Fully) Homomorphic Encryption and communication (e.g., and PIR) application 112 in client 110; or a (Fully) Homomorphic Encryption and communication (e.g., and PIR) application 172 in server 170.

Furthermore, the computer system 210 could be in the cloud and be formed from processors 220 and memories 225, as resources assigned to, e.g., a server 170. The computer system 210 could be a device such as a smartphone, tablet, or personal computer, e.g., for a user 201 for a client 110.

Now that an overview of an exemplary method and system has been described, some additional background is now described. Concerning (Ring) Learning With Errors (LWE), security of the GSW cryptosystem [43] is based on the hardness of the decision (ring) learning with errors (R)LWE problem [71, 62]. LWE uses the ring of integers $R=\mathbb{Z}$, while RLWE typically uses the ring of integers R of a cyclotomic field. A "yes" instance of this problem for modulus q, dimension k, and noise distribution $\chi$ over R consists of many uniform $\vec{a}_i \in R_q^k$ together with the values $b_i := \langle \vec{s}, \vec{a}_i \rangle + e_i \in R_q$ where $\vec{s}$ is a fixed secret vector and $e_i \leftarrow \chi$. In a "no" instance, both the $\vec{a}_i$'s and $b_i$'s are uniform. The decision (R)LWE assumption is that the two distributions are computationally indistinguishable—i.e., that "yes" instances are pseudorandom. Typically, $\chi$ is such that $\|e_i\|_\infty < \alpha$ for some size bound $\alpha$ with probability overwhelming in the security parameter $\lambda$. The security parameter also lower bounds the ring size and/or the dimension k, and the ratio $\alpha/q$. Although RLWE-based schemes are more efficient, LWE is referred to in the rest of this part of this document.

Regarding LWE with matrix secrets, an LWE instance may (more generally) be associated to a secret matrix S', and one can prove via a hybrid argument that breaking the matrix version of LWE is as hard as breaking conventional LWE. In this version, a "yes" instance consists of a uniform matrix A and B=S'A+E. Let us give dimensions to these matrices: s' is $n_0 \times k$, A is $k \times m$, B and E are $n_0 \times m$. See FIG. 3 for an illustration of these matrices in one exemplary construction. Set $n_1 = n_0 + k$. Set $S = [S'|I] \in R_q^{n_0 \times n_1}$ and P to be the matrix with—A on top of B. Then SP=E mod q. The LWE assumption (matrix version) says that this P is pseudorandom. In GSW (generalized for matrices), P is set to be the public key.

Figure 3:
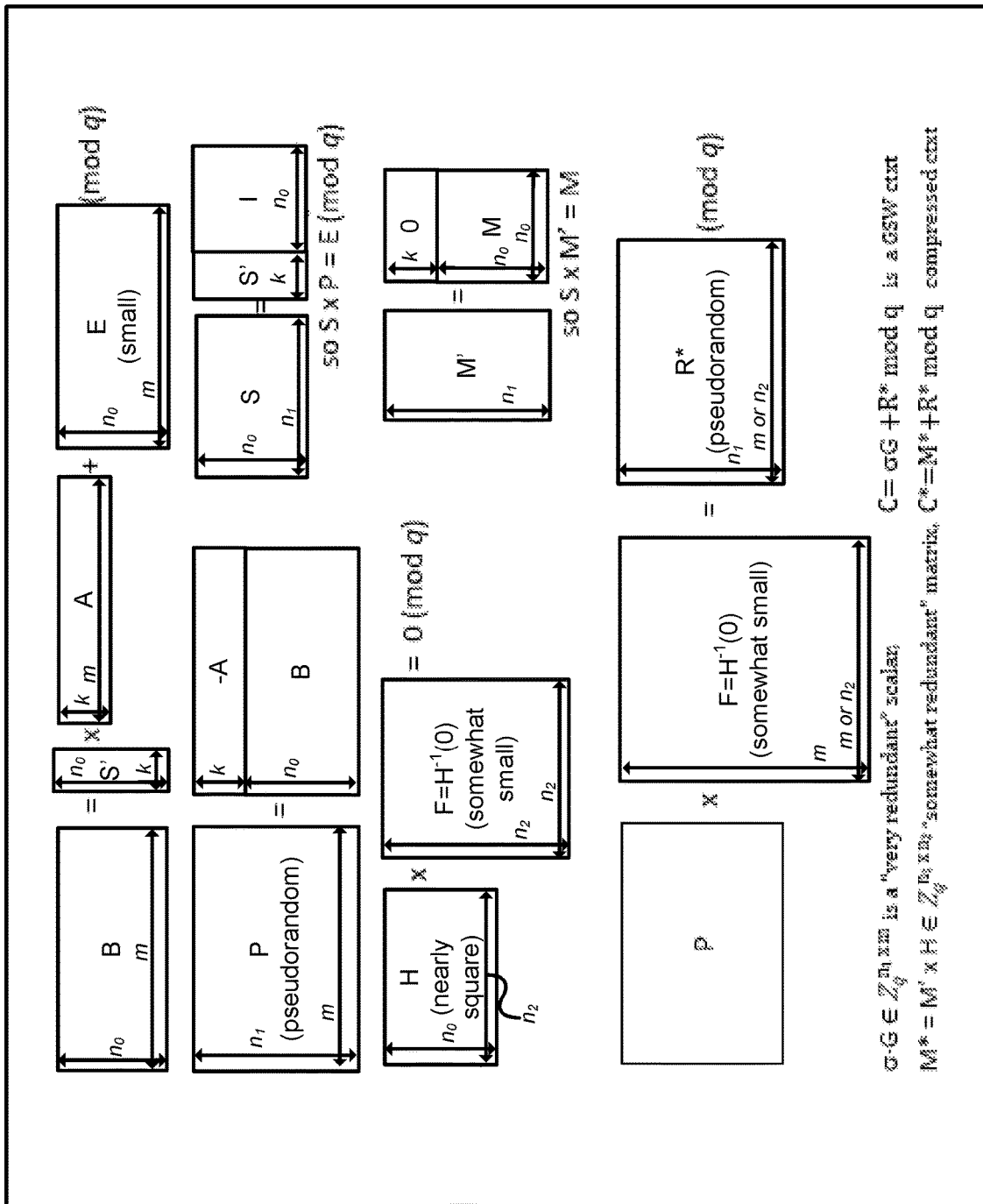
FIG. 3 is an illustration of the matrices in one exemplary construction.

With respect to FIG. 3, for some small $\epsilon > 0$ one has $n_1 = n_0 + k \approx n_2 = n_0(1 + \epsilon/2)$ and $m = n_1 \log q$. So, $n_0 \approx 2k/\epsilon$. Also, for correct decryption of ciphertexts with error E using gadget matrix H, $\|E\|_\infty < q^{\epsilon/2}$ is required. The following are also noted: $\sigma \cdot G \in Z_q^{n_1 \times n_2}$ is a "very redundant" scalar; $M^* = M' \times H \in Z_q^{n_1 \times n_2}$ is a "somewhat redundant" matrix; $C = \sigma G + R^*$ mod q is a GSW ciphertext (ctxt); and $C^* = M^* + R^*$ mod q is a compressed ciphertext (ctxt).

Regarding gadget matrices, GSW uses a rectangular gadget matrix [64], $G \in R_q^{n_1 \times m}$ to add redundancy to the ciphertext (which is used for both homomorphic multiplication and decryption). Often G is set to be $I_{n_1} \otimes \vec{g}$ where $\vec{g}$ is the vector $(1, 2, 4, \ldots, 2^{\lfloor \log q \rfloor})$—that is, $m = n_1 \lfloor \log q \rfloor$ and G's rows consists of shifts of the vector $\vec{g}$. As common in the literature, the notation $G^{-1}(C)$ is used to denote a matrix with small coefficients such that $G \cdot (G^{-1}(C)) = C$. When G uses $\vec{g} = (1, 2, 4, \ldots, 2^{\lfloor \log q \rfloor})$ one can efficiently find a suitable $G^{-1}(C)$ that has coefficients in $\{0,1\}$. There exists a canonical $G^{-1}(0)$ whose entries are in $\{0,1\}$ and that is full rank over R. One can think of computing $G^{-1}(C)$ as first finding any Y such that $G \cdot Y = C$, and then making Y smaller by subtracting off a Y' that is close to Y and is in the lattice generated by the vectors in $G^{-1}(0)$. More generally with $\vec{g}' = (1, B^2, B^2, \ldots, B^{\lfloor \log_B q \rfloor})$, $G^{-1}(C)$ has coefficients in $[\pm B/2]$. If C has dimension $n_1 \times c$, then $G^{-1}(C)$ has dimension $m \times c$.

For GSW encryption and decryption, to encrypt the scalar matrix $M = \sigma \cdot I_{n_0}$, the encrypter sets $M' = \sigma \cdot I_{n_1}$, chooses a random $m \times m$ matrix X whose entries are elements of R with small norm, and outputs $C = M' \cdot G + P \cdot X \in R_q^{n_1 \times m}$. To decrypt, one computes $$S \cdot C = S \cdot M' \cdot G + S \cdot P \cdot X = M \cdot S \cdot G + E',$$

where $E' = E \cdot X$ has small coefficients. Assuming E' has coefficients bounded by an appropriate $\beta$, then $E' \cdot G^{-1}(0)$ will have entries too small to wrap modulo q allowing the decrypter to recover E' (since $G^{-1}(0)$ is full rank and invertible over the field of fractions associated to R) and hence recover $M \cdot S \cdot G$. As $S \cdot G$ has rank $n_0$ (in fact it contains $I_{n_0}$ as a submatrix), the decrypter can obtain M and $\sigma$. It is said that C GSW-encrypts M if $S \cdot C = M \cdot S \cdot G + E$ for E bounded by $\beta$.

If M is not a scalar matrix, it is unclear how to obtain a GSW-encryption of M. If a candidate ciphertext is $C = M' \cdot G + P \cdot X$ as before, M' needs to satisfy $S \cdot M' = M \cdot S$. Finding such an M' is easy when M is a scalar matrix: M is the scalar matrix with the same scalar, but in a larger dimension. However, when M is not a scalar matrix, finding such an M' seems to require knowing S. Hiromasa et al. [52] show how to obtain a version of GSW that encrypts non-scalar matrices assuming LWE and a circular security assumption: encryptions of the secret key are needed for the matrix encryption step. In an exemplary embodiment, LWE (without circular encryptions) is relied on for the encryption step, and so the GSW ciphertexts will only encrypt scalars.

With respect to homomorphic operations in GSW, suppose there are $C_1$ and $C_2$ that GSW-encrypt $M_1$ and $M_2$ respectively. Then clearly $C_1 + C_2$ GSW-encrypts $M_1 + M_2$ provided that the sum of errors remains $\beta$-bounded. For multiplication, set $C^x = C_1 \cdot G^{-1}(C_2)$ mod q. A result is the following:

$$S \cdot C^x = (M_1 \cdot S \cdot G + E_1) \cdot G^{-1}(C_2) = M_1 \cdot M_2 \cdot S \cdot G + M_1 \cdot E_2 + E_1 \cdot G^{-1}(C_2).$$

Thus, $C^x$ GSW-encrypts $M_1 \cdot M_2$ provided that the new error $E' = M_1 \cdot E_2 + E_1 \cdot G^{-1}(C_2)$ remains $\beta$-bounded. In the new error, the term $E_1 \cdot G^{-1}(C_2)$ is only slightly larger than the original error $E_1$, since $G^{-1}(C_2)$ has small coefficients. To keep the term $M_1 \cdot E_2$ small, there are two strategies. First, if $M_1$ corresponds to a small scalar—e.g., 0 or 1 then this term is as small as the original error inside $C_2$. Second, if $E_2 = 0$, then this term does not even appear. For example, if one wants to homomorphically multiply-by-constant $\sigma_2 \in R_q$, one can just set $C_2 = \sigma_2 \cdot G$ (without any $P \cdot X$), and compute $C^x$ as above. The plaintext inside $C_1$ will be multiplied by $\sigma_2$, and the new error will not depend on either $\sigma_1$ or $\sigma_2$, which therefore can be arbitrary in $R_q$.

Concerning partial compression of GSW ciphertexts, GSW already supports partial compression of ciphertexts (relatively speaking, the resultant compressed ciphertexts are much larger than the compressed ciphertexts achieved herein), in the sense that many bit ciphertexts can be compressed to a single ciphertext encrypting a larger scalar in R (without increasing the noise much). As an easy example, consider the case of LWE-based GSW (where $R=\mathbb{Z}$), and let $C_0, \ldots, C_{\ell-1}$ be GSW ciphertexts that encrypt bits $\sigma_0, \ldots, \sigma_{\ell-1}$. To compress, simply set $$C = \sum_{i=0}^{\ell-1} C_i \cdot G^{-1}(2^i \cdot G) \bmod q.$$

That is, the $C_i$'s are multiplied by the scalars $2^i$ using the multiply-by-constant procedure described above (which does not increase the noise substantially), then the results are added up. Clearly C encrypts the scalar $x=\Sigma_i 2^i \sigma_i \bmod q$. As long as $\ell < \log q$, once decrypted, one can read the bits $\sigma_i$ off of the binary representation of x.

This generalizes to other rings R, so long as one can encode scalars $x \in R$ in binary as $x=\Sigma_i \sigma_i r_i$ (with the $r_i \in R$ a fixed basis independent of x and the $\sigma_i$'s as "the bits of x"), and recover the $\sigma_i$'s from x upon decryption. For example for $R=\mathbb{Z}_q[X]/F(X)$, one can use the basis elements $2^j X^k$ for $j=0, \ldots, \lfloor \log q \rfloor$ and $k=0, 1, \ldots \deg(F)-1$.

Note however, this only partially compresses GSW ciphertexts: the plaintext/ciphertext ratio remains at most $1/n_1 m$. To keep the noise small, GSW ciphertexts typically encrypt bits. Roughly speaking, for some upper bound L, one can compress $\ell \leq L$ GSW ciphertexts $C_0, \ldots, C_{\ell-1}$ that encrypt bits $(\sigma_0, \ldots, \sigma_{\ell-1}$ into a single ciphertext C that encrypts $\sigma \in R_q$ whose binary representation is $(\sigma_0, \ldots, \sigma_{\ell-1}, 0, \ldots, 0) \in \{0,1\}^L$. For this binary representation, it is required that there are elements $r_1, \ldots, r_L \in R_q$ such that the map $\rho: \{0,1\}^L \to R_q$ given by $\rho(\sigma_1, \ldots, \sigma_L) = \Sigma \sigma_i r_i$ is injective, and one can efficiently compute preimages of $\rho$. For example, if $R=\mathbb{Z}$, one can set $r_i$ to be simply $2^{i-1}$ for $i \leq L = \lfloor \log q \rfloor$. (If R is a polynomial ring, the binary representation is slightly more complicated.) To compress, simply set $C=\Sigma_i C_i \cdot G^{-1}(r_i \cdot G) \bmod q$. In other words, one may multiply $C_i$'s plaintext by $r_i$ using the multiply-by-constant procedure described above (which does not increase the noise substantially), and add the results up. Decryption works by recovering the element of $R_q$ that is encrypted, and then extracting its (unique) binary representation. However, this only partially compresses GSW ciphertexts: the plaintext/ciphertext ratio remains at most $1/n_1 m$.

With respect to compressible homomorphic encryption, this topic begins by defining the notion of a compressible (fully) homomorphic encryption, then it is described how to realize one based on LWE (and circular security if one wants to get FHE).

In terms of definitions, compressible (F)HE is very similar to standard (F)HE, except that one insists that decryption is broken into first compression and then "compressed decryption." Here, the definition is presented just for the simple case of 1-hop fully homomorphic encryption for bits, but the same type of definition applies equally to multiple hops, different plaintext spaces, and/or partially homomorphic. (See [51] for detailed treatment of all these variations.)

Definition 1. A compressible fully homomorphic encryption scheme (e.g., scheme 25 in FIG. 1) comprises five procedures, (KeyGen, Encrypt, Evaluate, Compress, Decrypt):

1) $(\mathfrak{s}, pk) \leftarrow KeyGen(1^\lambda)$. Takes the security parameter $\lambda$ and outputs a secret/public key-pair.

2) $\mathfrak{c} \leftarrow Encrypt(pk, b)$. Given the public key and a plaintext bit, outputs a low-rate ciphertext.

3) $\vec{c}' \leftarrow Evaluate(pk, \Pi \vec{c})$. Takes a public key pk, a circuit $\Pi$, a vector of low-rate ciphertexts $\vec{c} = \langle \mathfrak{c}_1, \ldots, \mathfrak{c}_t \rangle$, one for every input bit of $\Pi$, and outputs another vector of low-rate ciphertexts $\vec{c}'$, one for every output bit of $\Pi$.

4) $\vec{c}^* \leftarrow Compress(pk, \vec{c}')$. Takes a public key pk and a vector of low-rate ciphertexts $\vec{c} = \langle \mathfrak{c}_1, \ldots, \mathfrak{c}_t \rangle$, and outputs one or more compressed ciphertexts $\vec{c}^* = \langle \mathfrak{c}_1^*, \ldots, \mathfrak{c}_s^* \rangle$.

5) $\vec{b} \leftarrow Decrypt(\mathfrak{s}, \mathfrak{c}^*)$. On secret key and a compressed ciphertext, outputs a string of plaintext bits.

The procedure Decrypt is extended to a vector of compressed ciphertext by decrypting each one separately. The scheme is correct if for every circuit $\Pi$ and plaintext bits $\vec{b} = \{0,1\}^t$, one for every input bit of $\Pi$, see Equation (1) below:

$$Pr \begin{bmatrix} (\mathfrak{s}, pk) \leftarrow KeyGen(1^\lambda), \vec{c} \leftarrow Encrypt(pk, \vec{b}), \\ \vec{c}' \leftarrow Evaluate(pk, \prod, \vec{c}) \\ : \prod(\vec{b}) \text{ is a prefix of } Decrypt(\mathfrak{s}, Compress(pk, \vec{c}')) \end{bmatrix} = 1. \quad (1)$$

Note that prefix is allowed since the output of Decrypt could be longer than the output length of $\Pi$.

The scheme has rate $\alpha=\alpha(\lambda) \in (0,1)$ if for every circuit $\Pi$ with sufficiently long output, plaintext bits $\vec{b} = (b_1, \ldots, b_t) \in \{0,1\}^t$, and low rate ciphertexts $\vec{c} \leftarrow Evaluate(pk, \Pi, Encrypt(pk, \vec{b}))$ as in Equation 1 one has the following: $|Compress(pk, \vec{c}')| \leq |\Pi(\vec{b})|/\alpha$.

With respect to the gadget matrix H, a new technical component in one variant of an exemplary construction is a "nearly square" gadget matrix. Consider first why the usual Micciancio-Peikert gadget matrix [64] $G \in \mathbb{Z}_q^{n_1 \times m}$, which is used in GSW, cannot give us high rate. If (as discussed above, and similar to [52]) an encryption of $M \in R_q^{n_0 \times n_0}$ has the form $$C = M' \cdot G + P \cdot X \text{ for } M' = \begin{bmatrix} 0 \\ M \end{bmatrix},$$

then the rate can be at most $n_0/m$ simply because C has $m/n_0$ times as many columns as M. This rate is less than $1/\log q$ for the usual G.

Of course one can use $G = I \otimes \vec{g}$ where $\vec{g} = (1, B, B^2, \ldots, B^{\lfloor \log_B q \rfloor})$ for $B>2$, and $G^{-1}(C)$ would still have coefficients of magnitude at most $B/2$. But this can at best yield a rate-½ scheme (for $B=\sqrt{q}$), simply because a non-trivial $\vec{g}$ must have dimension at least 2. To achieve rate cannot close to 1, it is possible to replace G with a matrix that is "nearly square". The property that is needed from G is that there exists a known matrix $F=G^{-1}(0) \in R^{m \times m}$ such that:

1. F has small entries ($\ll q$)
2. $G \cdot F = 0 \bmod q$

3. F is full-rank over R (but of course not over $R_q$, kernel as it is the keel of G).

Given such an F, one can easily compute a $G^{-1}(C)$ for any ciphertext $C \in R_q^{n_1 \times m}$, such that the entries in $G^{-1}(C)$ are not much larger than the coefficients of F.

In an exemplary setting, it is desirable the new gadget matrix (called H rather than G to avoid confusion) to have almost full rank modulo q (so that it is "nearly square"), so it is desirable that $F=H^{-1}(0)$ has very low rank modulo q. Once there is a low-norm matrix F with full rank over R but very low rank modulo q, H is simply set as a basis of the mod-q kernel of F.

Suppose for simplicity that one has $q=p^t-1$ for some integers p,t. A matrix F' may be generated, with "somewhat small" coefficients, that has full rank over the reals but rank one modulo q as:

$$F' := \begin{bmatrix} 1 & p & p^2 & & p^{t-1} \\ p^{t-1} & 1 & p & \cdots & p^{t-2} \\ p^{t-2} & p^{t-1} & 1 & & p^{t-3} \\ & \vdots & & \ddots & \vdots \\ p & p^2 & p^3 & \cdots & 1 \end{bmatrix}$$

Notice that the entries of F' have size at most $(q+1)/p \approx q^{1-1/t}$ and moreover for every vector $\vec{v}$ there exists the following:

$$\|\vec{v}F'\|_\infty \leq \|\vec{v}\|_\infty \cdot (1 + p + \ldots + p^{t-1}) = \qquad (2)$$
$$\|\vec{v}\|_\infty \cdot (p^t - 1)/(p-1) = \|\vec{v}\|_\infty \cdot \frac{q}{p-1}.$$

Moreover this bound is rather tight, in particular $$\|\vec{v}F'\|_\infty > \|\vec{v}\|_\infty \cdot \frac{q}{p-1} \cdot \left(1 - \frac{2}{p}\right).$$

This F' may be used in an exemplary embodiment to generate a matrix F with rank r·t over the reals but rank r modulo q (for any r), by tensoring F' with the r×r identity matrix, $F := F' \otimes I_r$. This yields the exact same bounds as above on the $l_\infty$ norms. The gadget matrix H is an $r(t-1) \times rt$ matrix whose rows span the null space of F modulo q (any such matrix will do). Hence for this exemplary scheme, one sets $n_0 = r(t-1)$ and $$n_2 = rt = n_0\left(1 + \frac{1}{t-1}\right).$$

In the decryption of compressed ciphertexts below, "somewhat smallness" of $F=H^{-1}(0)$ is used. Specifically, given a matrix $Z=MH+E \pmod q$ with $$\|E\|_\infty \leq \frac{p-1}{2},$$

first multiply it by F modulo q to get $ZF=(MH+E)F=EF \pmod q$ (since $HF=0 \pmod q$). But $$\|EF\|_\infty \leq \|E\|_\infty \cdot \frac{q}{p-1} \leq \frac{p-1}{2} \cdot \frac{q}{p-1} = q/2,$$

and therefore $(ZF \mod q)=EF$ over the integers. Now use the fact that F has full rank over the reals, and recover $E:=(ZF \mod q) \times F^{-1}$. Then compute $Z-E=MH \pmod q$, and since H has rank $n_0$ modulo q one can recover M from MH. It follows that to ensure correctness when decrypting compressed ciphertexts, it is sufficient to use a bound $$\beta \leq \frac{p-1}{2} = \lfloor q^{1/t} \rfloor / 2$$

on the size of the noise in compressed ciphertexts.

The restriction $q=p^t-1$ is not really necessary; many variants are possible. The following rather crude approach works for any q that are likely to be encountered. Consider the lattice L of multiples of the vector $\vec{u}=(1, a, \ldots, a^{t-1})$ modulo q, where $a=\lceil q^{1/t} \rceil$. Let the rows of F' be the L-vectors $c_i \vec{u} \mod q$ for $i \in [t]$, where $c_i = \lceil q/a^i \rceil$. Clearly F' has rank 1 modulo q. (A proof is omitted that F' is full rank over the integers.) Herein, it is claimed that all entries of F' are small. Consider the j-th coefficient of $c_i \cdot u \mod q$, which is $\lceil q/a^i \rceil \cdot a^j$ mod q for $i \in [t]$, $j \in \{0, \ldots, t-1\}$. If $i>j$, then $\lceil q/a^i \rceil \cdot a^j$ is bounded in magnitude by $q/+a^{i-j}+a^j \leq q/a+a^{t-1} \leq 2a^{t-1}$. For the $j \geq i$ case, observe that $\lceil q/a^i \rceil \cdot a^i$ is an integer in $[q, q+a^i]$, and therefore is at most a modulo q. Therefore $\lceil q/a^i \rceil \cdot a^j \mod q$ is at most $a^j \leq a^{t-1}$ modulo q. As long as $q \geq t^t$, one has that $a^{t-1} \leq (q^{1/t} \cdot (1+1/t))^{t-1} < q^{(t-1)/t} \cdot e$—that is, $\|F'\|_\infty$ is nearly as small as it was when $q=p^t-1$ was used. As seen above, q anyway needs to exceed $\beta^t$ where $\beta$ is a bound on the noise of ciphertexts, so the condition that $q>t^t$ will likely already be met.

If $q=p_1 \ldots p_t$ for mutually relatively prime $p_i$'s, one can draw F' from the lattice L of multiples of the vector $\vec{u}=(q/p_1, \ldots, q/p_t)$ modulo q. Specifically, let the i-th row of F' be $(0, \ldots, 0, q/p_i, 0, \ldots, 0)$. This F' is clearly full rank, and has entries comparable to $q^{(t-1)/t}$ when the $p_i$'s are roughly the same size.

The different procedures are now elaborated on that comprise exemplary compressible homomorphic encryption schemes, such as high-rate HE schemes and compression techniques.

For key generation, to generate a secret/public key pair, it is possible to choose two uniformly random matrices $S' \in R_q^{n_0 \times k}$ and $A \in R_q^{k \times m}$ and a small matrix $E \leftarrow \chi^{n_0 \times m}$, and compute the pseudorandom matrix $B := S' \times A + E \in R_q^{n_0 \times m}$.

The secret key is the matrix $S=[S'|I_{n_0}] \in R_q^{n_0 \times n_1}$ and the public key is $$P = \begin{bmatrix} -A \\ B \end{bmatrix} \in R_q^{n_1 \times m},$$

and one has $S \times P = S' \times (-A) + I \times B = E \pmod q$.

Regarding encryption, decryption, and evaluation, encryption and decryption of small scalars and evaluation of a circuit on them may be performed exactly as in the original GSW scheme. Namely a scalar $a \in R$ is encrypted by choosing a matrix $X \in R^{m \times m}$ with small entries, then outputting the ciphertext $C := \sigma G + PX \pmod q$.

The decryption invariant is SC=σSG+E(mod q) with E<<q. To decrypt, set Z:=S×C mod q and then use the trapdoor for G to eliminate the small noise E and find σ.

Evaluation too is the same as in GSW, with addition implemented by just adding the ciphertext matrices modulo q and multiplication implemented as $C^x := C_1 \times G^{-1}(C_2)$ mod q. Showing that these operations maintain the decryption invariant (as long as the encrypted scalars are small) is again done exactly as in GSW.

With respect to compressed decryption, recall that compressed ciphertexts are matrices $C \in R_q^{n_1 \times n_2}$, encrypting plaintext matrices $M \in R_q^{n_0 \times n_0}$. The decryption invariant for compressed ciphertexts is S C=M H+E(mod q) for a low-norm matrix $E \in R_q^{n_0 \times n_2}$, where H is the nearly square gadget matrix previously described. As long as $\|E\|_\infty < \beta$, one can complete decryption by using the trapdoor $F = H^{-1}(0)$ to eliminate the small noise E and recover the matrix M.

Regarding compression, it is now shown how to pack many GSW bit encryptions into a single compressed ciphertext. For convenience, it is assumed that one has already used the partial compression technique described above to compress (many) GSW ciphertexts that encrypt bits into (fewer) ciphertexts that encrypt elements of $R_q$. Note, however, that the noise level of the final compressed ciphertext will be lower if the entire compression is done in one step, rather than two steps. It also assumed that the original GSW ciphertexts are under a key S that is suitable for an exemplary compressed HE scheme. If not, one can do a "key switch" to make it so. Key switching [16, 15, 39] converts a message from being under one key to another via homomorphic decryption, but in a "linear" way that does not reduce the noise level and is much less computationally expensive than bootstrapping.

Consider $n_0^2$ GSW ciphertexts, $C_{u,v} \in R_q^{n_1 \times m}$ u, $v \in [n_0]$, each encrypting an element $\sigma_{u,v}$ of $R_q$. Namely one has $S \times C_{u,v} = \sigma_{u,v} \cdot SG + E_{u,v}$ (mod q).

To pack all these ciphertexts into a single compressed ciphertext, denote by $T_{u,v}$ the square $n_0 \times n_0$ singleton matrix with 1 in entry (u, v) and 0 elsewhere, namely $T_{u,v} = \vec{e}_u \otimes \vec{e}_v$ (where $\vec{e}_u$, $\vec{e}_v$ are the dimension-$n_0$ unit vectors with 1 in positions u, v respectively). Also denote by $T'_{u,v}$ the padded version of $T_{u,v}$ with k zero rows on top, $$T'_{u,v} = \begin{bmatrix} 0 \\ \vec{e}_u \otimes \vec{e}_v \end{bmatrix} \in R_q^{n_1 \times n_0}.$$

The $C_{u,v}$'s are compressed by computing $$C^* = \sum_{u,v} C_{u,v} \times G^{-1}(T'_{u,v} \times H) \bmod q.$$

It is first noted that $T'_{u,v} \times H$ are $n_1 \times n_2$ matrices, hence $G^{-1}(T'_{u,v} \times H)$ are $m \times n_2$ matrices, and since the $C_{u,v}$'s are $n_1 \times m$ matrices then $C^* \in R_q^{n_1 \times n_2}$ as needed. One may observe that $$S \times C^* = \sum_{u,v} S \times C_{u,v} \times G^{-1}(T'_{u,v} \times H) \quad (3)$$

$$= \sum_{u,v} (\sigma_{u,v} SG + E_{u,v}) \times G^{-1}(T'_{u,v} \times H)$$

$$= \sum_{u,v} \sigma_{u,v} ST'_{u,v} H + \overbrace{\sum_{u,v} E_{u,v} \times G^{-1}(T_{u,v} \times H)}^{E'}$$

$$\stackrel{(*)}{=} \overbrace{\left( \sum_{u,v} \sigma_{u,v} T_{u,v} \right)}^{M} \times H + E',$$

where $M = [\sigma_{u,v}] \in [q]^{n_0 \times n_0}$. (The equality (*) holds since S=[S'|1] and $$T' = \begin{bmatrix} 0 \\ T \end{bmatrix}$$

and therefore $ST' = S' \times 0 + I \times T = T$.)

It is noted that the compressed decryption above recovers the matrix M and then one can read off the $\sigma_{u,v}$'s which are entries of M.

In addition to the basic compressible HE interfaces, an exemplary scheme also supports several other operations that come in handy in a PIR application. These operations are described below.

Concerning a procedure denoted as procedure (i), encryption of compressed ciphertexts, one can directly encrypt a matrix $M \in R_q^{n_0 \times n_0}$ in a compressed ciphertext by choosing a random $X \in R^{m \times n_2}$ with small entries, computing the pseudo-random X':=PX mod q and the somewhat redundant plaintext $$M^* = \begin{bmatrix} 0 \\ M \end{bmatrix} \times H \bmod q$$

and outputting the ciphertext C=M*+X' mod q.

With respect to a procedure denoted as procedure (ii), additive homomorphism for compressed ciphertexts, it is clear that compressed ciphertexts can be added and multiplied by small scalars. Indeed if $M_1$, $M_2$ are matrices over $R_q$ and σ is a small scalar, and if one has $SC_i = M_i H + E_i$ for i=1, 2, then $S(C_1 + C_2) = (M_1 + M_2)H + (E_1 + E_2)$ and $S \times \sigma C_1 = \sigma M_1 H + \sigma E_1$. As long as $(E_1 + E_2)$ and $\sigma E_1$ have smaller $l_\infty$ norm than β, the results are valid compressed ciphertexts for $M_1 + M_2$ mod q and $\sigma M_1$ mod q, respectively.

Regarding a procedure denoted as procedure (iii), multiplying GSW ciphertexts by compressed ciphertexts, one can also multiply a GSW ciphertext C encrypting a small scalar u by a compressed ciphertext $C' \in R_q^{n_1 \times n_2}$ encrypting a matrix M over $R_q$, to get a compressed ciphertext C" encrypting the matrix σM mod q. This is done by setting $C'' := C \times G^{-1}(C')$ mod q (and note that $G^{-1}(C')$ is well defined as C' has $n_1$ rows). For correctness, recall that one has SC=σSG+E and SC'=MH+E' over $R_q$, and therefore $$S \times C'' = SCG^{-1}(C') = \sigma SC' + EG^{-1}(C') \quad (4)$$

$$= \sigma(MH + E') + E^* = \sigma MH + \overbrace{(\sigma E' + EG^{-1}(C'))}^{E''} (\bmod q).$$

This is a valid compressed encryption of σM mod q as long as the noise $E'' = +E' + E G^{-1}(C')$ is still smaller than the bound β.

With respect to a procedure denoted as procedure (iv), multiplying GSW ciphertexts by plaintext matrices, the same technique that lets one right-multiply GSW ciphertexts by compressed ones also lets one right-multiply them by plaintext matrices. Indeed if $M \in R_q^{n_0 \times n_0}$ is a plaintext matrix and M' is its padded version $$M' = \begin{bmatrix} 0 \\ M \end{bmatrix} \in R_q^{n_1 \times n_0},$$

then the somewhat redundant matrix $M^* = M' \times H$ can be considered a noiseless ciphertext (note that $X \times M^* = MH$) and can therefore be multiplied by a GSW ciphertext as above. The only difference is that in this case one can even use a GSW ciphertext encrypting a large scalar: The "noiseless ciphertext" $M^*$ has $E'=0$, hence the term $\sigma E'$ from above does not appear in the resulting noise term, no matter how large $\sigma$ is.

A large number of further possible optimizations and variations when discussing exemplary PIR applications are described below. One exemplary main optimization is the use of modulus-switching techniques to handle larger noise.

With respect to setting the parameters, it remains to show how to set the various parameters—including the matrix dimensions $n_0$, $n_1$, $n_2$, and the noise bounds $\alpha$ and $\beta$—as a function of the security parameter. If a somewhat-homomorphic variant of GSW without bootstrapping is used, then the parameter $\beta$ that bounds the noise in evaluated ciphertexts would depend on the functions that are desired to be computed. One such concrete example (with fully specified constants) is provided below for an exemplary PIR application. Here an asymptotic analysis of the parameters is provided when using GSW as a fully-homomorphic scheme with bootstrapping. Namely one would like to evaluate an arbitrary function with long output on encrypted data (using the GSW FHE scheme), then pack the resulting encrypted bits in compressed ciphertexts that remain decryptable.

An exemplary embodiment ensures that compressed ciphertexts have rate of $1-\varepsilon$ for some small $\varepsilon$ of a given choosing. This means that one needs $n_0^2/(n_1 n_2) \geq 1-\varepsilon$, so it is sufficient to set both $n_1$, $n_2$ to be at least $$n_0 / \left(1 - \frac{\varepsilon}{2}\right).$$

Using $$n_2 = n_0 / \left(1 - \frac{\varepsilon}{2}\right)$$

for the nearly square gadget matrix H means that one should keep the noise below $\beta = \lfloor q^{e/2}/2 \rfloor$ to be able to decrypt.

Following [43, 17], when using GSW with fresh-ciphertext noise of size $\alpha$ and ciphertext matrices of dimension $n_1 \times m$, arbitrary computation may be performed and then bootstrapping the result performed, and the noise after bootstrapping is bounded below $\alpha m^2$. Unifying partial compression using techniques from above and further compression from equation (3) into one step, one has a set of $n_0^2 \log q$ error matrices $E_{u,v,w}$, all satisfying $\|E_{u,v,w}\|_\infty < \alpha m^2$. The error term after compression is therefore $\Sigma_{u,v,w} E_{u,v,w} G^{-1}$ (something), and its size is bounded by $n_0^2 \log q \cdot \alpha m^2 \cdot m = \alpha m^3 n_0^2 \log q$. It is therefore sufficient to instantiate the scheme with bound $\beta = \alpha m^3 n_0^2 \log q$. Since one needs $\beta < q^{e/2}/2$, the following correctness constraint is determined:

$$\frac{q^{e/2}}{2} > \alpha m^3 n_0^2 \log q \Rightarrow q \geq (\alpha \cdot poly(k/\varepsilon))^{2/\varepsilon}. \quad (5)$$

Setting $\alpha \leq poly(k/\varepsilon)$, this means that one needs $q = (k/\varepsilon)^{\Theta(1/\varepsilon)}$. Hence the security of the scheme relies on the hardness of LWE with gap $k^{\Theta(1/\varepsilon)}$, and in particular if $\varepsilon$ is a constant then one may rely on LWE with polynomial gap.

It is noted that there are many techniques that can be applied to slow the growth of the noise. Many of those techniques (for example modulus switching) are described below in the context of an exemplary PIR application. While they do not change the asymptotic behavior—one likely will always need $q = (k/\varepsilon)^{\Theta(1/\varepsilon)}$—they can drastically improve the constant in the exponent.

Concerning a variant without the gadget matrix H, described here is a variant of an exemplary scheme which is more similar to Regev encryption, in that the variant does not use the gadget matrix H but rather relies on scaling up the message so the message is larger than the noise. Specifically, this scheme features a plaintext modulus smaller than the ciphertext modulus $p < q$. Compressed ciphertexts are vectors $\vec{c} \in R_q^{n_1}$, encrypting plaintext vector $\vec{m} \in R_p^{n_0}$, and the decryption invariant is $S\vec{c} = \lceil p/q \rceil \cdot \vec{m} + \vec{\eta} \pmod{q}$ for a low-norm vector $\vec{n} \in R_q^{n_0}$. One has the bound $\beta = q/2p$, and as long as $\|\vec{\eta}\|_\infty < \beta$, one can recover the plaintext via $\vec{m} = r \lfloor [S\vec{c}]_q \cdot p/q \rfloor$ (just like for Regev encryption).

The rate of compressed ciphertexts is $$\frac{n_0}{n_1} \cdot \frac{|p|}{|q|}.$$

As before, one can ensure a small error $\vec{\eta}^{e/2}/2$ and set $p \approx 1^{-1/2\varepsilon}$. This yields $$\frac{|p|}{|q|} \approx (1 - \varepsilon/2),$$

which together with $n_1 \leq n_0(1-\varepsilon/2)$ yields rate $1-\varepsilon$.

Compressing GSW ciphertexts is similar to above, except that one should scale by $\lceil q/p \rceil$ when partially compressing bit encryptions into scalar encryptions. Namely, given $\ell = \lfloor \log p \rfloor$ GSW ciphertexts encrypting bits $b_0, \ldots, b_\ell$, the technique presented above may be used to partially compress them into a single GSW ciphertext encrypting $$\sum_{i=0}^{\ell} b_i \cdot 2^i \lceil p/q \rceil.$$

This yields a GSW ciphertext encrypting a scalar of the for $\lceil p/q \rceil \cdot \sigma$ for some $\sigma \in \mathbb{Z}_p$. Given $n_0$ such ciphertexts $C_i$, encrypting $\sigma_i$, these are compressed by setting $$C^* = \sum_i C_i \times G^{-1}(\vec{e}'_i) \bmod q,$$

where $\vec{e}'_i$ is the i'th unit vector prepended with k zeros. (That is, $\vec{e}'_i = (0^{k+1-1} 1 0^{n0-i})^t$. The result is a compressed encryption of the vector $[\sigma_i]_i$.

It is easy to check that this variant too enjoys additive homomorphism of compressed ciphertexts, and the ability to multiply GSW a ciphertext on the right by a compressed ciphertext (yielding a compressed ciphertext encrypting the product).

Now that general schemes for (F)HE compression of ciphertexts has been described, the application of these schemes to private information retrieval (PIR) is described. PIR lets clients retrieve entries from a database held by a server without the server learning what entries were retrieved. A naïve solution would have the server send its entire database to the client, and Chor et al. [25] initiated the study of more bandwidth efficient solutions. PIR protocols offer ways to reduce the bandwidth overhead (as compared to the insecure solution), making it sublinear in the number N of entries in the database.

It is well known that homomorphic encryption can be used for that purpose: The client can encrypt the index of the entry that it wants, and the server can perform homomorphic evaluation of a table lookup function, returning the encrypted entry. This solution has the server returning a single encrypted entry, so the bandwidth overhead is mostly just the plaintext-to-ciphertext ratio of the homomorphic scheme, which is independent of the number of entries. But if the entries themselves are large (as in a movie database where each movie is several gigabytes long), then even this N-independent overhead could be very costly. See [55, 1, 60] for more discussions. Clearly, if there is a compressible HE scheme, this could be used to make the bandwidth overhead arbitrarily close to one.

The first single-server rate-1 PIR scheme for large entries was described by Kiayias et al. [55], using the Damgård-Jurik encryption scheme [31] that supports plaintext-to-ciphertext expansion ratio arbitrary close to one. But Damgård-Jurik is only additively homomorphic, so their solution becomes much more complicated, relying on the Ishai-Paskin homomorphic construction for branching-programs [53] (which internally uses Damgård-Jurik). An exemplary compressible HE schemes therefore offers a new avenue for getting a rate-1 PIR, relying on the (quantum-safe) LWE hardness instead of on the N-th residuosity hardness assumption of Damgård-Jurik. Beyond bandwidth, realistic PIR systems must worry also about computational efficiency. A PIR scheme must process all the bits in database for every query, and most single-server PIR schemes apply a rather expensive processing for each bit. In particular the rate-optimal scheme from [55] must apply at a minimum one multiplication per bit modulo an RSA modulus (of at least 2048 bits). This was highlighted by a study of Sion and Carbunar [77], who concluded (in 2007) that "deployment of non-trivial single server PIR protocols on real hardware of the recent past would have been orders of magnitude less time-efficient than trivially transferring the entire database." It is noted that sending the entire database is not computationally free: it involved at least encrypting the whole database for purposes of communication security. Nonetheless, over a decade after the Sion-Carbunar study, prior to the instant work there was no single-server PIR scheme that could compete with the trivial scheme in terms of computation. Below, a series of optimizations are described for exemplary schemes, yielding a construction which is not only bandwidth efficient but should also outperform whole-database AES encryption.

With respect to moving toward exemplary optimized PIR schemes, a starting point is the basic hierarchical PIR, where the N database entries are arranged in a hypercube of dimensions $N = N_1 \times \ldots \times N_D$ and the scheme uses degree-d homomorphism:

1) The client's index $i \in [N]$ is represented in mixed radix of basis $N_1, \ldots, N_D$, namely as $(i_1, \ldots, i_D)$ such that $$i = \sum_{j=1}^{D} i_j \cdot \prod_{k=j+1}^{D} N_k.$$

The clients message is processed to obtain an encrypted unary representation of all the $i_j$'s. Namely, for each dimension j one gets a dimension-$N_j$ vector of encrypted bits, in which the $i_j$'th bit is one and all the others are zero.

2) Processing the first dimension, each hyper-row $u \in [N_1]$ is multiplied by the u'th encrypted bit from the first vector, which zeros out all but the $i_1$'st hyper-row. It is noted that the i'th hyper-row (say, in the first dimension) is just a slice of the hypercube in which the first index is i. That is, all the entries in the hypercube whose indexes are of the form (i, *, *, ..., *) (where * can be anything. Similarly the i'th hyper-row in the second dimension are all the entries with indexes of the form (*, i, *, ..., *). One then adds all the resulting encrypted hyper-rows, thus getting a smaller hypercube of dimension $N/N_1 = N_2 \times \ldots N_D$, consisting only of the $i_1$'st hyper-row of the database.

3) A similar manner is proceeded to be used to fold the other dimensions, one at a time, until one is left with a zero-dimension hypercube consisting only the selected entry i.

It is noted that the first step (step (1)), reducing database size from N to $N/N_1$, is typically the most expensive since this step processes the most data. On the other hand, that step only requires ciphertext-by-plaintext multiplications (versus the ciphertext-by-ciphertext multiplications that are needed in the following steps), so this step can sometimes be optimized better than the other steps.

The sequence of derivations and optimizations are now described to get an exemplary final construction, resulting in a high rate PIR scheme which is also computationally efficient. The construction features a tradeoff between bandwidth and computation. Below, a variant is described with rate 4/9.

With respect to using ring-LWE, as usual with LWE schemes, one can improve performance by switching to the ring (or module) variant, where the LWE secret has low dimension over a large extension field. Instead of having to manipulate large matrices, these variants manipulate low-dimension matrices over the same large extension field, which take less bits to describe and can be multiplied faster (using FFTs). To get comparable security, if the basic LWE scheme needs LWE secrets of dimension k, the new scheme will have dimension-k' secrets over an extension field of degree d, such that $k'd \geq k$. (For ring-LWE one has k'=1 and d=k.) The various matrices in the scheme consist of extension-field elements, and their dimensions are $n'_i = n_i/d$ and m'=m/d (instead of $n_i$, m, respectively). Below, the notation $n'_i$ and m' are used to emphasize the smaller values in the RLWE context.

Concerning saving on FFTs, one optimization that may be used and makes exemplary PIR schemes more efficient (for large databases) is pre-processing the database to minimize the number of FFTs during processing. The operations in a ring-LWE variant of the instant schemes include matrix multiplication over the underlying field that are most efficient when the elements are represented in evaluation (CRT) basis, and applications of $G^{-1}(\cdot)$ that require representation in the coefficient (decoding) basis. While converting between the two can be done in quasi-linear time using FFTs, it is still by far the most expensive operations used in the implementation. (For exemplary typical sizes, converting an element between these representations is perhaps 10-20 times slower than multiplying two elements represented in the CRT basis.)

As in the XPIR work [1], one can drastically reduce the number of FFTs by pre-processing the database, putting it all in CRT representation. This way, one only needs to compute FFTs when the client's message is processed to get the encrypted unary representation of the $i_j$'s (which is independent of the size of entries in the database), and then again after the first dimension is folded (so the FFTs are only applied to compressed ciphertexts encrypting the $N/N_1$ database entries).

If one sets $N_1$ large enough (relative to the FFT overhead), then the FFTs after folding the first dimension will be amortized and become insignificant. On the other hand, one needs to set $N_1$ small enough (relative to $N/N_1$ and the length-L of the entries) so the initial FFTs (of which one has about $n'_1 \cdot m' \cdot N_1$) will also be insignificant.

In the description below, the various parameters with $N_1=2^8$ are illustrated, which seems to offer a good tradeoff. For the other $N_i$'s, there is (almost) no reason to make them large, so one may use $N_2=N_3=\ldots=N_D=4$. It is noted that for the construction below there is (almost) no limit on how many such small $N_i$'s one may use. Below an exemplary construction is illustrated for a database with $N=2^{20}$ entries, but the construction can handle much larger databases. (The same parameters work to infinity and beyond, at least $N=2^{2^{20}}$ entries.)

Regarding client-side encryption, in the context of a PIR scheme, the encrypter is the client who has the decryption key. Hence the client can create ciphertexts using the secret key, by choosing a fresh pseudorandom public key $P_i$ for each ciphertext and setting $C_i:=\sigma_i G+P_i$ mod q. This results in ciphertexts of slightly smaller noise, namely just the low-norm $E_i$'s (as opposed to $E \times X_i$ that one gets from public-key encrypted ciphertexts).

Since an exemplary PIR construction uses small dimensions $N_2=N_3=\ldots=4$, the client may directly send the encrypted unary vectors for these dimensions. Namely for each $j=2, 3, \ldots$ the client sends four ciphertexts $C_{j,0}, \ldots, C_{j,3}$ such that C encrypts one and the others encrypt zero.

For the first dimension there is a large $N_1=2^8$, however, so the client sends encryptions of the bits of $i_1$ and the GSW homomorphism is used to compute the encrypted unary vector for this dimension. Overall the client therefore sends $\log N_1+(N_2+N_3+\ldots N_D)$ encrypted bits, in exemplary illustrated sizes this comes up to $8+4\times 6=32$ encrypted bits.

With respect to multiple G matrices, the accumulated noise in an exemplary scheme has many terms of the form $E\times G^{-1}(\text{something})$, but not all of them are created equal. In particular, when folding the first (large) dimension $N_1$, the GSW ciphertexts are evaluated and the noise in them is itself a sum of such. When these GSW ciphertexts are multiplied by the plaintext matrix, one gets $E\times G^{-1}(\text{something})\times G^{-1}(\text{something}')$, which is larger. For the other (small) dimensions, on the other hand, these are multiplied by fresh ciphertexts so much smaller noise is achieved. This imbalance leads to wasted resources.

Moreover, the multiplication by $G^{-1}(\text{something})$ during the initial processing of the client's bits is only applied to a small amount of data. But the multiplication between the GSW matrices and the plaintext data touches all the data in the database. Hence the latter are much more expensive, and it would be beneficial to reduce the dimension of the matrices involved as much as possible.

For all of these reasons, it is better to use different G matrices in different parts of the computation. In particular, very wide-and-short G matrices (with smaller norm of $G^{-1}(0)$) may be used when initially processing the client's bits, and more-square/higher-norm G matrices later on.

As for modulus switching, even with a careful balance of the G matrices, one cannot make the noise as small as the noise is desired to be for an exemplary compressed scheme. The modulus-switching technique from [16, 15] may be used, therefore. Namely, the computation is performed relative to a large modulus Q, then is switched to a smaller modulus q before sending the final result to the client, thereby scaling the noise roughly by q/Q.

An exemplary initial noise analysis indicated that it could be possible to use a modulus q of roughly 64 bits if the GSW G matrix had been set to be very wide and short, since using the wide and short matrix would have kept the noise very small throughout the computation. But this would have entailed a large increase in bandwidth, computation and storage at the server. For example, the server needs to store in CRT basis all the plaintext matrices $G^{-1}(M')$, which is more than 32 times larger than the plaintext matrix M itself. (Also no parameters were found that would allow achieving a rate better than ⅓ for that case.)

A better option is to use a significantly larger modulus, at least initially, and then use modulus switching to scale it down to 64 bits (or perhaps even smaller). This lets the system be more tolerant for noise, which improves many of the parameters. For example, by using $Q\approx q^{2.5}$ one can even replace the G matrix for the actual data by the identity matrix. Even if it means using LWE secret of twice the dimension and having to write numbers that are more than twice as large, using the identity matrix would still save a large constant factor. Moreover, it lets one use a more square matrix H (e.g. 2×3) thereby getting a higher rate.

It is noted that using modulus switching requires that the secret key is chosen from the error distribution rather than uniformly. (Also in the way one may implement the modulus switching, for some of the bits, $q'\cdot\sigma$ is encrypted rather than $\sigma$ itself (where $Q=q'\cdot q$).)

A detailed PIR scheme example is now presented. This is presented in conjunction, in part, with FIG. 4, which is a flowchart of an exemplary method of using compressible (F)HE with application to PIR. For this example, an exemplary construction is staged in the cyclotomic ring of index $2^{13}$ and dimension $2^{12}$, i.e., $R=\mathbb{Z}[X]/(X^{12}+1)$. The ciphertext modulus of the fresh GSW ciphertext is a composite $Q=q\cdot q'$, with $q\approx 2^{46}$ and $q'\approx 2^{60}$ (both with primitive $2^{12}$'th roots of unity so therefore it is easy to perform FFTs modulo q,q'). Below the rings modulo these three moduli are denoted by $R_Q, R_q, R_{q'}$.

Ring-LWE over $R_Q$ is used in this example, in particular an LWE secret is a scalar in $R_Q$ chosen from the error distribution [7]. (Consulting Table 1 from [2], using this cyclotomic ring with a modulus Q of size up to 111 bits yields security level of 128 bits.)

For the various matrices in the exemplary construction in this example, dimensions k'=1, n'$_0$=2, and n'$_1$=n'$_2$=3 are used, and the plaintext elements are taken from R$_q$. Hence one may achieve a rate of $$\left(\frac{2}{3}\right)^2 \approx 0.44.$$

While processing, however, most ciphertexts will be modulo the larger Q=q·q', it is only before sending to the clients that these are mod-switched down to q. The construction described above is used with a 2-by-3 matrix H.

Figure 4:
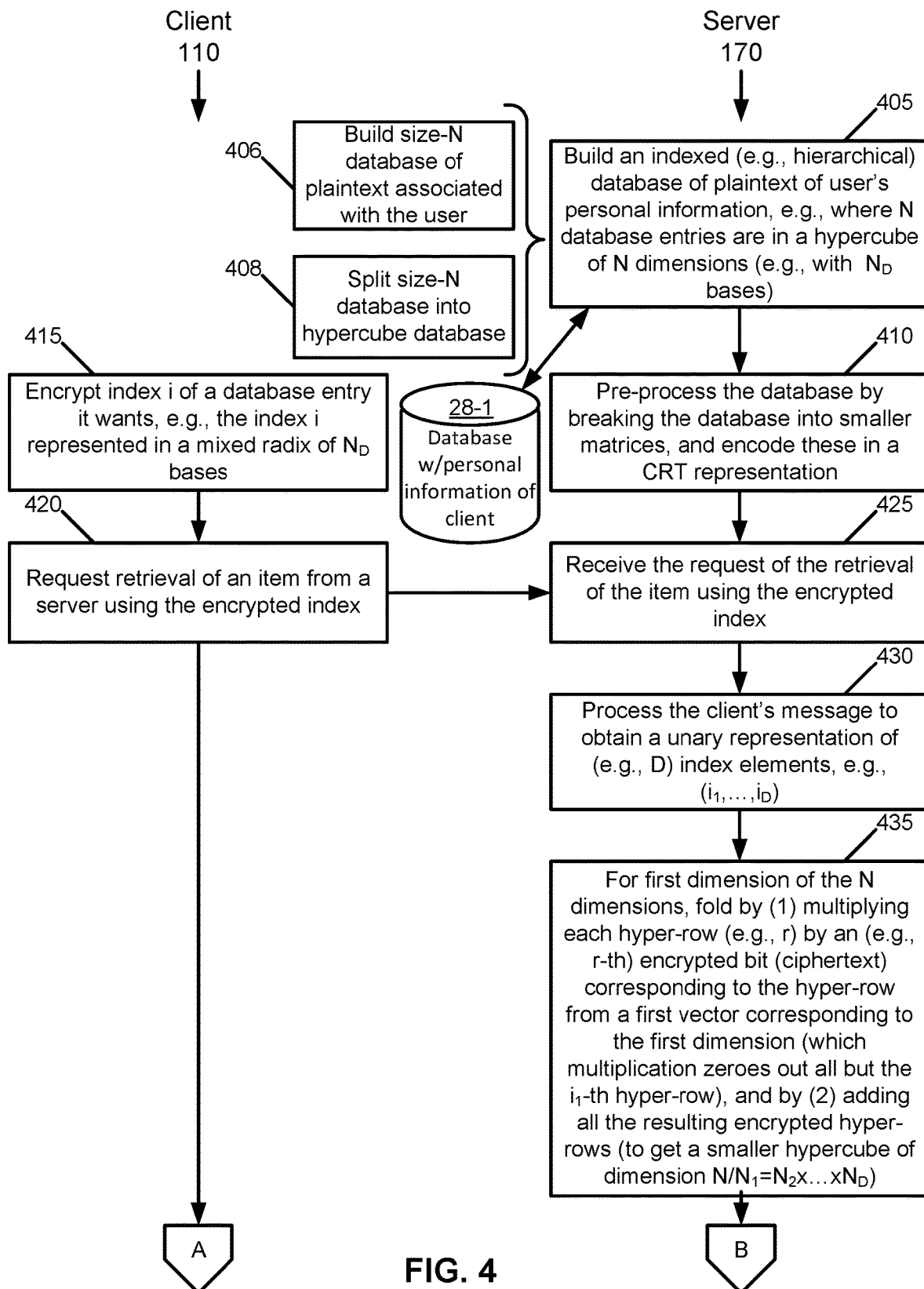
FIG. 4 is a flowchart of an exemplary method of using compressible (F)HE with application to PIR.
Figure 4:
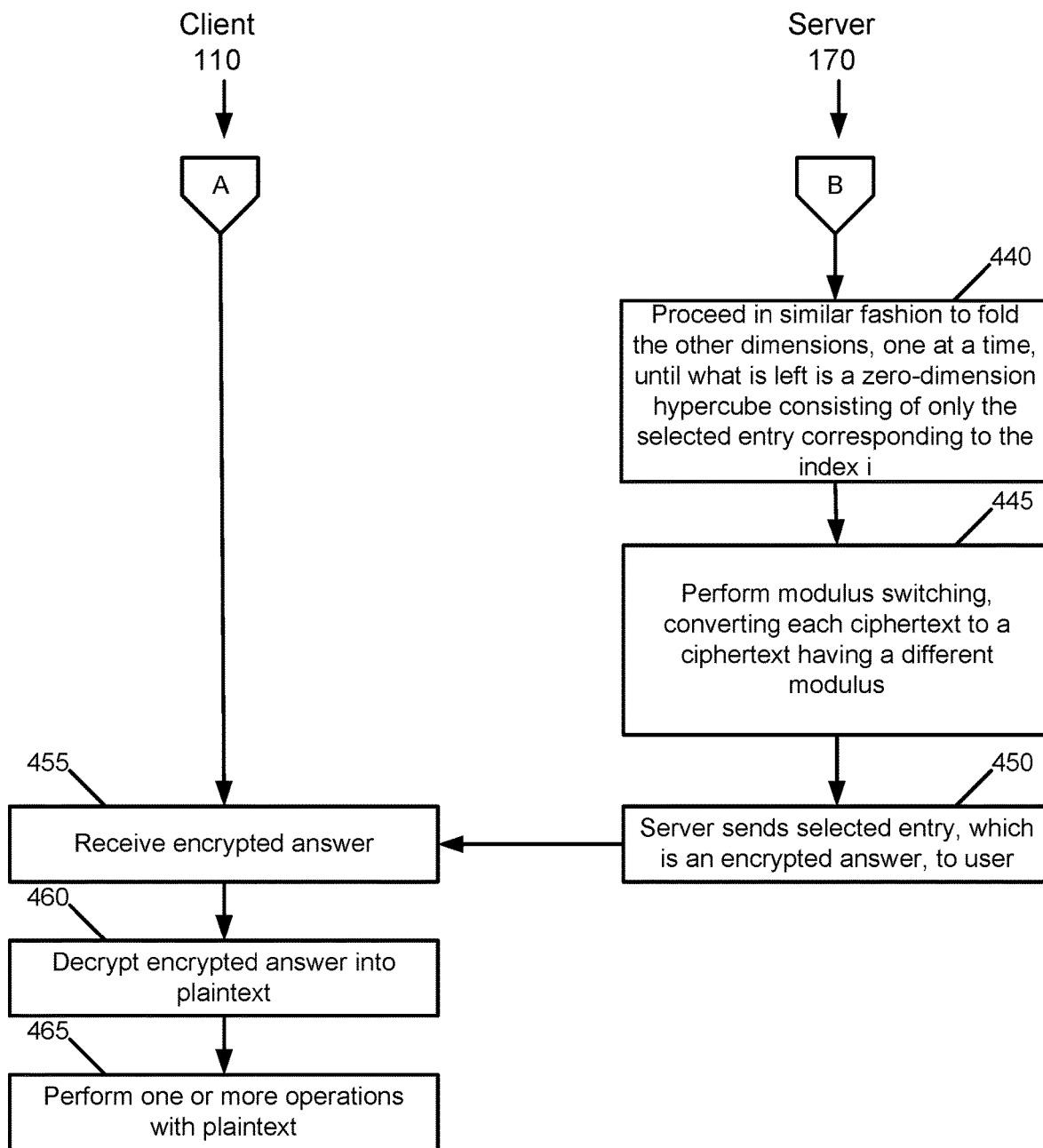

FIG. 4 illustrates possible operations performed by the client 110 on the left-hand side and operations performed by the server 170 on the right-hand side. In FIG. 4, the coordination operations in FIG. 1 in order to set up and using the compressible (F)HE scheme for this example are not shown. However, one set up operation that is performed is illustrated by block 405, where the server 170 builds an indexed (e.g., hierarchical) database of plaintext of user's personal information, e.g., where N database entries are in a hypercube of N dimensions (e.g., with N$_D$ bases). This database 28-1 may be built using personal information of a user 201 supplied by the client 110 or by other providers. The example below uses plaintext in the database 28-1, but the database 28-1 may store ciphertext (instead of plaintext) from the user 201.

In one example, in block 406, the server 170 builds a size-N database of plaintext associated with the user 201, and in block 408, the server 170 splits the size-N database into a hypercube database. In more detail, a size-N database is split into a hypercube of dimensions N=256×4×4× . . . ×4. A client wishing to retrieve an entry i∈[N] first represents i as (i$_1$, i$_2$, . . . , i$_D$), with i$_1$∈[256] and i$_j$[4] for all j>1. In block 415, the client 110 encrypts index i of a database entry the client wants, e.g., the index i represented in a mixed radix of N$_D$ bases. This uses the Encrypt procedure. In additional detail, let σ$_{1,0}$, . . . , σ$_{1,7}$ be the bits of i$_1$, the client 110 then encrypts the scalars q'·σ$_{1,0}$ and σ$_{1,1}$, . . . , σ$_{1,7}$ in GSW ciphertexts (modulo Q). For j=2, . . . , D the client uses GSW ciphertexts to encrypt the bits of the unit vector e$_{i_j}$ which is 1 in position i$_j$ and zero elsewhere. In this example, three different gadget matrices are used for these GSW ciphertexts:

a) For the LSB of i$_1$ (which will be the rightmost bit to be multiplied using GSW), that gadget matrix G is eliminated altogether and just the identity is used, but the bit σ$_{1,0}$ is multiplied by q'. Namely there exists C$_{1,0}$∈R$_Q^{n'1×m'1}$ such that SC$_{1,0}$=σ$_{1,0}$q'S+E∈R$_Q^{n'0×n'1}$.

b) For the other bits of i$_1$, a wide and short G$_1$∈ℤ$^{n'1×m'1}$ is used, where m'$_1$=n'$_1$⌈log$_4$Q⌉=3·53=159. Each bit σ$_{1,t}$ is encrypted by C$_{1,t}$∈R$^{n'1×m'1}$ such that SC$_{1,t}$=σ$_{1,t}$SG$_1$+E(mod Q).

c) For the bits encoding the unary representation of the other i$_j$'s (j>1), a somewhat rectangular (3-by-6) matrix G$_2$∈ℤ$^{n'1×m'2}$ is used, where m'$_2$=n'$_1$ log$_{⌈2^{53}⌉}$(Q)=3·2=6.

The client 110 sends all these ciphertexts to the server, as part of the request retrieval of an item from a server using the encrypted index in block 420. The encryption of the bits of i$_1$ consists of 9 elements for encrypting the LSB and 7·3·159=3381 elements for encrypting the other seven bits. In block 425, the server receives the request. In block 430, the server 170 processes the client's message to obtain a unary representation of (e.g., D) index elements, e.g., (i$_1$, . . . , i$_D$). Note that this may use procedure (iii), multiplying GSW ciphertexts by compressed ciphertexts, described above. For example, the request may be in the form of GSW query ciphertext(s). In more detail, for each of the other indexes i$_j$, 4·3·6=72 elements are used to encrypt the unary representation of i$_j$. In this numerical example with N=2$^{20}$ database entries there are 6 more i$_j$'s, so the number of ring elements that the client sends is 9+3381+6·72=3822. Each element takes 106·2$^{12}$ bits to specify, hence the total number of bits sent by the client is 106·2$^{12}$·3822≈2$^{30.6}$ (a bulky 198 MB). For applications where the client query size is a concern, one can tweak the parameter, e.g. giving up a factor of 2 in the rate, and getting a 2-4 times improvement in the client query size. Better yet, the query-expansion technique in the SealPIR work [5] can be applied in the instant setting too, to get a very significant reduction in the client query size without compromising on the rate.

It is noted this assumes the database 28-1 has been pre-processed prior to block 430. That is, the server in block 410 pre-processes its database by breaking each entry into 2-by-2 plaintext matrices over R$_q$ (recall q≈2$^{46}$). Hence each matrix holds 3·2·46·2$^{12}$=2$^{20.11}$ bits (roughly 138 KB). The server encodes (block 410) each entry in these matrices in CRT representation modulo Q. Note that additional processes after this may use the procedure (iv), multiplying GSW ciphertexts by plaintext matrices, described above, if the database 28-1 contains plaintext. The result of the CRT representation modulo Q is plaintext. Note also that this example uses a plaintext (or part plaintext) database 28-1, but the database could also be encrypted, and then the procedure (iii), multiplying GSW ciphertexts by compressed ciphertexts, described above could be used. While the entries in the plaintext matrices are small (in [±2$^{45}$]), their CRT representation modulo Q is not. Hence this representation entails a 106/46≈2.3 blowup in storage requirement at the server. Below, L is set to be the number of matrices that it takes to encode a single database entry. (A single JPEG picture will have L≈3, while a 4 GB movie will be encoded in about 29K matrices).

Given the client's ciphertext, the server in block 435 may use GSW evaluation to compute the GSW encryption of the unit vector e$_{i_1}$ for the first dimension (this can be done using less than N$_1$=256 GSW multiplications). This process may also use the procedure (iv), multiplying GSW ciphertexts by plaintext matrices, described above. For r=1, 2, . . . , 256 the server folds this dimension by (1) multiplying the r'th ciphertext in this vector by all the plaintext matrices of all the entries in the r'th hyper-row of the hypercube, and by (2) adding everything across the first hypercube dimension. Note that the adding may use the procedure (ii), additive homomorphism for compressed ciphertexts, described above. The result is a single encrypted hyper-row (of dimension N$_2$× . . . ×N$_D$), each entry of which consists of L compressed ciphertexts.

The server next (block 440) continues to fold the small dimensions one after the other. For each size-4 dimension, the server multiplies the four GSW-encrypted bits by all the compressed ciphertexts in the four hyper-columns, respectively, then adds the results across the current dimension, resulting in a 4-fold reduction in the number of ciphertexts. This continues until the server is left with just a single entry of L compressed ciphertexts modulo Q.

Finally, the server performs (block 445) modulus switching, replacing each ciphertext C by C'=⌈C/q⌉∈R$_q$, and sends the resulting ciphertexts to the client for decryption. Note that the ciphertext C satisfied SC=q'MH+E(mod q'q). Denoting the rounding error by Ξ, the new ciphertext has $$SC'=S(C/q'+\Xi)=MH+E/q'+S\Xi(\mathrm{mod}\ q).$$

Since the key S was chosen from the error distribution and $\|\vec{\xi}\|_\infty \leq \frac{1}{2}$, then the added noise is small and the result is a valid ciphertext. (See more details below.)

In block 450, the server 170 sends the selected entry, which is an encrypted answer to the request, to the user, and the client 110 receives the encrypted answer in block 455. In block 460, the client 110 decrypts the encrypted answer into plaintext, therefore revealing the requested entry. The client 110 in block 465 performs one or more operations with plaintext. For instance, if the user 201 had requested a balance on their checking account, the user 201 would then perhaps add more money to their checking account or use their checking account to pay a credit card, as examples.

With respect to noise analysis, for the first dimension, one needs to use GSW evaluation to compute the encrypted unary vector, where each ciphertext in that vector is a product of $\log N_1 = 8$ ciphertexts. Hence the noise of each these evaluated ciphertexts has roughly the form $$\sum_{u=1}^{7} E_u \times G_1^{-1}$$

(something) with $E_u$ of the error matrices that were sampled during encryption. Once these are multiplied by the plaintext matrices for the database to get the compressed encryption as in Equation (4) and all the ciphertexts are added across the $N_1$-size dimension, a noise term is determined of the form:

$$\sum_{v=1}^{N_1} \left( \sum_{u=1}^{7} E_u \times G_1^{-1}(\text{something}_u) \right) \times \text{plaintext}_v.$$

(Note that on the right multiplication is performed by the plaintext matrix whose entries are bounded below $2^{45}$, but without any $G^{-1}$.) Note that asymptotically, and disregarding an unconventional way used herein of introducing the plaintexts which optimizes concrete performance, the noise from this step grows linearly with $N_1$. If one sets $N_1 = O(\log N + \lambda)$ for security parameter $\lambda$, the noise from this and the remaining steps will be bounded by $O(\log N + \lambda)$, and so q can be bounded by a constant-degree polynomial of these quantities. Given that the complexity of mod-q multiplication is $\log q \cdot \tilde{O}(\log \log q)$, the asymptotic overhead of this exemplary PIR scheme will be $\tilde{O}(\log \log \lambda + \log \log \log N)$.

The entries of the E.'s can be chosen from a distribution of variance 8 (which is good enough to avoid the Arora-Ge attacks [8]). The entries of $G^{-1}(\cdot)$ are in the range $[\pm 2]$ (because one has $m_1 = n_1 \log_4(Q)$), so multiplication by $G_I$ (something) increases the variance by a factor of less than $2^2 \cdot m'_1 \cdot 2^{12} < 2^{21.4}$. Similarly, multiplying by a plaintext matrix (of entries in $[\pm 2^{45}]$) increases the variance by a factor of the following: $2^{2 \cdot 45} \cdot n_1 \cdot 2^{12} < 2^{103.6}$. The variance of each noise coordinate is therefore bounded by $2^{8} \cdot 7 \cdot 8 \cdot 2^{21.4} \cdot 2^{103.6} < 2^{8+3+3+21.4+103.6}$. Since each noise coordinate is a weighted sum of the entries of the $E_u$'s with similar weights, it makes sense to treat it as a normal random variable. A good high probability bound on the size of this error is (say) 16 standard deviations, corresponding to probability $\text{erfc}(16/\sqrt{2}) \approx 2^{-189}$. Namely after folding the first dimension, all the compressed ciphertexts have $\|\text{noise}\|_\infty < 16 \cdot \sqrt{2^{139}} = 2^{73.5}$ with high probability.

As one continues to fold more dimensions, the encrypted unary vectors are again multiplied for those dimensions (which are GSW ciphertexts) by the results of the previous dimension (which are compressed ciphertexts) using Equation (4), this time using $G_2$. It is noted that the GSW ciphertexts in these dimensions are fresh, hence their noise terms are just the matrices E that were chosen during encryption. Thus each of the $N_1$ noise terms in this dimension is of the form $E \times G_2^{-1}$ (something) for one of these E matrices. Moreover, only one of the four terms in each dimension has an encrypted bit $\sigma = 1$ while the other have $\sigma = 0$. Hence the term $\sigma \cdot$previous Noise appears only once in the resulting noise term after folding the j'th dimension. Therefore folding each small dimension $j \geq 2$ just adds four noise terms of the form $E \times G^{-1}$(something) to the noise from the previous dimension.

Since $G_2$ has $m_2 = n_1 \log_{2^{53}}(Q)$, then each entry in $G_2^{-1}$ is in the interval $[\pm 2^{52}]$, and multiplying by $G_2$ increases the variance by a factor of less than $(2^{52})^2 \cdot m'_2 \cdot 2^{12} = 3 \cdot 2^{117}$ (recall $m'_2 = 6$). With $4(D-1) = 24$ of these terms, the variance of each coordinate in the added noise term is bounded by $24 \cdot 8 \cdot 3 \cdot 2^{117} = 9 \cdot 2^{123}$. One can therefore use the high-probability bound $16 \cdot \sqrt{9 \cdot 2^{123}} < 2^{67.1}$ on the size of the added noise due to all the small hypercube dimensions.

The analysis so far implies that prior to the modulus switching operation, the noise is bounded in size below $2^{73.5} + 2^{67.1}$. The added noise term due to the rounding error in modulus switching is $S \times \Xi$, and the variance of each noise coordinate in this expression is $8 \cdot n'_1 \cdot 2^{12}/2 = 3 \cdot 2^{15}$. Hence there is a high probability bound $16 \cdot \sqrt{3 \cdot 2^{15}} < 2^{12.3}$ on the magnitude of this last noise term. The total noise in the ciphertext returned to the client is therefore bounded by $$\|\text{noise}\|_\infty < \frac{2^{73.5} + 2^{67.1}}{q'} + 2^{12.3} \approx 2^{13.5} + 2^{7.1} + 2^{12} \approx 2^{14}.$$

Recalling that the nearly square gadget matrix H is used with $$p = \sqrt[3]{q} \approx 2^{46/3},$$

the noise is indeed bounded below $(p-1)/2$ as needed, and hence the ciphertexts returned to the client will be decrypted correctly with overwhelming probability.

As for complexity analysis, the work of the server while processing the query consists mostly of $R_Q$ multiplications and of FFTs. (The other operations such as additions and applications of $G^{-1}(\ )$ once the FFTs were performed take almost no time in comparison.)

With a cyclotomic ring of dimension $2^{12}$, each FFT operation is about 10-20 times slower than a ring multiply operation in evaluation representation. But it is easy to see that when $N/N_1$ times the size L of database entries is large enough, the number of multiplies dwarf the number of FFTs by a lot more than a 20x factor. Indeed, FFTs are only preformed in the initial phase where the bits of the index $i_j$ sent by the client (which are independent of L and of $N/N_1$) are processed, and after folding the first dimension (which only applies to $N/N_1 \approx 0.25\%$ of the data). With exemplary settings, the multiplication time should exceed the FFT time once $L \cdot N/N_1$ is more than a few thousands. With $N/N_1 = 4000$ in this example, even holding a single JPEG image in each entry already means that the FFT processing accounts for less than 50% of the overall time. And for movies where L=29K, the FFT time is entirely insignificant.

The time spent on multiplications may now be evaluated, as a function of the database size. For large L·N/N$_1$, by far the largest number of multiplications is performed when multiplying the GSW ciphertexts by the plaintext matrices encoding the database, while folding the first hypercube dimension. These multiplications have the form C':=C×M'H mod q'q with C' a hybrid ciphertext of dimension n$_1$×n$_1$ and M'H a redundant plaintext matrix of dimension n$_1$×n$_2$ (where n$_1$=n$_2$=3). Processing naïvely without any optimizations, one needs $3^3$=27 ring multiplications for each of these matrix multiplications, modulo the double-sized modulus q'·q. Each ring multiplication (for elements in CRT representation) consists of $2^{12}$ double-size modular integer multiplication, so each such matrix multiplication takes a total of $2 \cdot 27 \cdot 2^{12} \approx 2^{17.75}$ modular multiplications. For this work, a single plaintext matrix, containing about $2^{17.11}$ bytes, is processed so the amortized work is about 1.56 modular multiplication per database byte. (Using Laderman's method one can multiply 3-by-3 matrices with only 23 multiplications [59], so the amortized work is only 1.33 modular multiplications per byte.) Taking into account the rest of the work should not change this number in any significant way when L is large, these multiplications likely account for at least 90% of the execution time.

One (or even two) modular multiplication per byte should be significantly faster than AES encryption of the same data. For example software implementations of AES without any hardware support are estimated at 25 cycles per byte or more [76, 30]. Using the fact that the same GSW matrix is multiplied by very many plaintext matrices, one may be able to pre-process the modular multiplications, which should make performance competitive even with AES implementations that are built on hardware support in the CPU.

For large databases, the approach outlined above should be computationally faster than the naïve approach of sending the whole database, even without considering the huge communication savings. It is stressed that this speed was achieved while still providing great savings on bandwidth, indeed the rate of this solution is 0.44 so one pays with 2.25× in bandwidth for obtaining privacy.

As previously described, it is noted that citations to references are located as numbers within brackets (e.g., "[1]" is for reference number one). These references are related below. These references are also submitted in an Information Disclosure Statement.

[1] Carlos Aguilar-Melchor, Joris Barrier, Laurent Fousse, and Marc-Olivier Killijian. Xpir: Private information retrieval for everyone. *Proceedings on Privacy Enhancing Technologies*, 2016(2):155-174, 2016.

[2] Martin Albrecht, Melissa Chase, Hao Chen, Jintai Ding, Shafi Goldwasser, Sergey Gorbunov, Shai Halevi, Jeffrey Hoffstein, Kim Laine, Kristin Lauter, Satya Lokam, Daniele Micciancio, Dustin Moody Travis Morrison, Amit Sahai, and Vinod Vaikuntanathan. Homomorphic encryption standard. Availabale at http://homomorphicencryption.org/, accessed February 2019, November 2018.

[3] Jacob Alperin-Sheriff and Chris Peikert. Practical bootstrapping in quasilinear time. In Ran Canetti and Juan A. Garay, editors, *Advances in Cryptology—CRYPTO'13*, volume 8042 of *Lecture Notes in Computer Science*, pages 1-20. Springer, 2013.

[4] Jacob Alperin-Sheriff and Chris Peikert. Faster bootstrapping with polynomial error. In Juan A. Garay and Rosario Gennaro, editors, *Advances in Cryptology—CRYPTO 2014, Part I*, pages 297-314. Springer, 2014.

[5] Sebastian Angel, Hao Chen, Kim Laine, and Srinath Setty. Pir with compressed queries and amortized query processing. In 2018 *IEEE Symposium on Security and Privacy (SP)*, pages 962-979. IEEE, 2018.

[6] Yoshinori AONO, Takuya HAYASHI, Le Trieu PHONG, and Lihua WANG. Privacy-preserving logistic regression with distributed data sources via homomorphic encryption. *IEICE Transactions on Information and Systems*, E99.D(8):2079-2089, 2016.

[7] Benny Applebaum, David Cash, Chris Peikert, and Amit Sahai. Fast cryptographic primitives and circular-secure encryption based on hard learning problems. In *Advances in Cryptology—CRYPTO 2009, 29th Annual International Cryptology Conference*, Santa Barbara, Calif., USA, Aug. 16-20, 2009. *Proceedings*, pages 595-618, 2009.

[8] Sanjeev Arora and Rong Ge. New algorithms for learning in presence of errors. In *ICALP* (1), volume 6755 of *Lecture Notes in Computer Science*, pages 403-415. Springer, 2011.

[9] Saikrishna Badrinarayanan, Sanjam Garg, Yuval Ishai, Amit Sahai, and Akshay Wadia. Two-message witness indistinguishability and secure computation in the plain model from new assumptions. In *International Conference on the Theory and Application of Cryptology and Information Security*, pages 275-303. Springer, 2017.

[10] Daniel Benarroch, Zvika Brakerski, and Tancrede Lepoint. FHE over the integers: Decomposed and batched in the post-quantum regime. In *Public Key Cryptography* (2), volume 10175 of *Lecture Notes in Computer Science*, pages 271-301. Springer, 2017.

[11] Elliptic curve point multiplication, en.wikipedia.org/wiki/Elliptic_curve_point_multiplication, downloaded on 6/13/19.

[12] Dan Boneh, Craig Gentry, Shai Halevi, Frank Wang, and David J. Wu. Private database queries using somewhat homomorphic encryption. In *ACNS*, volume 7954 of *Lecture Notes in Computer Science*, pages 102-118. Springer, 2013.

[13] Elette Boyle, Yuval Ishai, and Antigoni Polychroniadou. Limits of practical sublinear secure computation. In *Annual International Cryptology Conference*, pages 302-332. Springer, 2018.

[14] Zvika Brakerski, Craig Gentry, and Shai Halevi. Packed ciphertexts in LWE-based homomorphic encryption. In Kaoru Kurosawa and Goichiro Hanaoka, editors, *Public Key Cryptography*, volume 7778 of *Lecture Notes in Computer Science*, pages 1-13. Springer, 2013.

[15] Zvika Brakerski, Craig Gentry, and Vinod Vaikuntanathan. Fully homomorphic encryption without bootstrapping. In *Innovations in Theoretical Computer Science (ITCS'12)*, 2012. Available at http://eprint.iacr.org/2011/277.

[16] Zvika Brakerski and Vinod Vaikuntanathan. Efficient fully homomorphic encryption from (standard) lwe. *SIAM Journal on Computing*, 43(2):831-871, 2014.

[17] Zvika Brakerski and Vinod Vaikuntanathan. Lattice-based FHE as secure as PKE. In Moni Naor, editor, *Innovations in Theoretical Computer Science, ITCS'14*, pages 1-12. ACM, 2014.

[18] Zvika Brakerski. Fully homomorphic encryption without modulus switching from classical gapsvp. In Reihaneh Safavi-Naini and Ran Canetti, editors, *CRYPTO*, volume 7417 of *Lecture Notes in Computer Science*, pages 868-886. Springer, 2012.

[19] Hao Chen, Kim Laine, and Rachel Player. Simple encrypted arithmetic library—SEAL v2.1. In *Financial*

[20] Jingwei Chen, Yong Feng, Yang Liu, and Wenyuan Wu. Faster binary arithmetic operations on encrypted integers. In *WCSE'17, Proceedings of 2017 the 7th International Workshop on Computer Science and Engineering*, 2017.

[21] Jung Hee Cheon, Jean-Sebastien Coron, Jinsu Kim, Moon Sung Lee, Tancrede Lepoint, Mehdi Tibouchi, and Aaram Yun. Batch fully homomorphic encryption over the integers. In *Advances in Cryptology—EUROCRYPT 2013, 32nd Annual International Conference on the Theory and Applications of Cryptographic Techniques*, Athens, Greece, May 26-30, 2013. Proceedings, pages 315-335, 2013.

[22] Jung Hee Cheon, Andrey Kim, Miran Kim, and Yong Soo Song. Homomorphic encryption for arithmetic of approximate numbers. In *ASIACRYPT* (1), volume 10624 of *Lecture Notes in Computer Science*, pages 409-437. Springer, 2017.

[23] Jung Hee Cheon, Miran Kim, and Myungsun Kim Search-and-compute on encrypted data. In *International Conference on Financial Cryptography and Data Security*, pages 142-159. Springer, 2015.

[24] Ilaria Chillotti, Nicolas Gama, Mariya Georgieva, and Malika Izabachène. Improving TFHE: faster packed homomorphic operations and efficient circuit bootstrapping. In *ASIACRYPT* (1), volume 10624 of *Lecture Notes in Computer Science*, pages 377-408. Springer, 2017.

[25] Benny Chor, Oded Goldreich, Eyal Kushilevitz, and Madhu Sudan. Private information retrieval. Journal of the ACM (JACM) JACM, Volume 45 Issue 6, November 1998, Pages 965-981.

[26] Jean-Sebastien Coron, Tancrede Lepoint, and Mehdi Tibouchi. Scale-invariant fully homomorphic encryption over the integers. In *Public-Key Cryptography—PKC'14*, volume 8383 of *Lecture Notes in Computer Science*, pages 311-328. Springer, 2014.

[27] Jean-Sébastien Coron, David Naccache, and Mehdi Tibouchi. Public key compression and modulus switching for fully homomorphic encryption over the integers. In *Advances in Cryptology—EUROCRYPT 2012-31st Annual International Conference on the Theory and Applications of Cryptographic Techniques*, Cambridge, UK, April 15-19, 2012. Proceedings, pages 446-464, 2012.

[28] Anamaria Costache, Nigel P. Smart, Srinivas Vivek, and Adrian Waller. Fixed-point arithmetic in SHE schemes. In *SAC*, volume 10532 of *Lecture Notes in Computer Science*, pages 401-422. Springer, 2016.

[29] Jack L. H. Crawford, Craig Gentry, Shai Halevi, Daniel Platt, and Victor Shoup. Doing real work with the: The case of logistic regression. Cryptology ePrint Archive, Report 2018/202, 2018. https://eprint.iacr.org/2018/202.

[30] Crypto++5.6.0, pentium 4 benchmarks. https://www.cryptopp.com/benchmarks-p4.html, accessed February 2019, 2009.

[31] Ivan Damgård and Mads Jurik. A generalisation, a simplification and some applications of paillier's probabilistic public-key system. In *International Workshop on Public Key Cryptography*, pages 119-136. Springer, 2001.

[32] Whitfield Diffie and Martin Hellman New directions in cryptography. *IEEE transactions on Information Theory*, 22(6):644-654, 1976.

[33] Léo Ducas and Daniele Micciancio. FHEW: bootstrapping homomorphic encryption in less than a second. In *EUROCRYPT* (1), volume 9056 of *Lecture Notes in Computer Science*, pages 617-640. Springer, 2015.

[34] Steven D Galbraith and Xibin Lin. Computing pairings using x-coordinates only. *Designs, Codes and Cryptography*, 50(3):305-324, 2009.

[35] Nicholas Genise, Craig Gentry, Shai Halevi, Baiyu Li, and Daniele Micciancio. Homomorphic encryption for finite automata. Cryptology ePrint Archive, Report 2019/176, 2019. https://eprint.iacr.org/2019/176.

[36] Craig Gentry, Shai Halevi, Charanjit S. Jutla, and Mariana Raykova. Private database access with he-over-oram architecture. In *ACNS*, volume 9092 of *Lecture Notes in Computer Science*, pages 172-191. Springer, 2015.

[37] Craig Gentry, Shai Halevi, Chris Peikert, and Nigel P. Smart. Field switching in BGV-style homomorphic encryption. *Journal of Computer Security*, 21(5):663-684, 2013.

[38] Craig Gentry, Shai Halevi, and Nigel P. Smart. Better bootstrapping in fully homomorphic encryption. In *Public Key Cryptography—PKC 2012*, volume 7293 of *Lecture Notes in Computer Science*, pages 1-16. Springer, 2012.

[39] Craig Gentry, Shai Halevi, and Nigel Smart. Fully homomorphic encryption with polylog overhead. In "*Advances in Cryptology—EUROCRYPT 2012*", volume 7237 of *Lecture Notes in Computer Science*, pages 465-482. Springer, 2012. Full version at http://eprint.iacr.org/2011/566.

[40] Craig Gentry, Shai Halevi, and Nigel Smart. Homomorphic evaluation of the AES circuit. In "*Advances in Cryptology—CRYPTO 2012*", volume 7417 of *Lecture Notes in Computer Science*, pages 850-867. Springer, 2012. Full version at http://eprint.iacr.org/2012/099.

[41] Craig Gentry and Shai Halevi. Fully homomorphic encryption without squashing using depth-3 arithmetic circuits. In *Foundations of Computer Science (FOCS)*, 2011 IEEE 52nd Annual Symposium on, pages 107-109. IEEE, 2011.

[42] Craig Gentry and Shai Halevi. Implementing gentry's fully-homomorphic encryption scheme. In *Advances in Cryptology—EUROCRYPT'11*, volume 6632 of *Lecture Notes in Computer Science*, pages 129-148. Springer, 2011.

[43] Craig Gentry, Amit Sahai, and Brent Waters. Homomorphic encryption from learning with errors: Conceptually-simpler, asymptotically-faster, attribute-based. In Ran Canetti and Juan A. Garay, editors, *Advances in Cryptology—CRYPTO 2013*, Part I, pages 75-92. Springer, 2013.

[44] Craig Gentry. How to compress rabin ciphertexts and signatures (and more). In *Annual International Cryptology Conference*, pages 179-200. Springer, 2004.

[45] Craig Gentry. Fully homomorphic encryption using ideal lattices. In *Proceedings of the 41st ACM Symposium on Theory of Computing—STOC 2009*, pages 169-178. ACM, 2009.

[46] Ran Gilad-Bachrach, Nathan Dowlin, Kim Laine, Kristin E. Lauter, Michael Naehrig, and John Wernsing. Cryptonets: Applying neural networks to encrypted data with high throughput and accuracy. In *ICML*, volume 48 of *JMLR Workshop and Conference Proceedings*, pages 201-210. JMLR.org, 2016.

[47] Matthew Green, Susan Hohenberger, and Brent Waters. Outsourcing the decryption of ABE ciphertexts. In *20th USENIX Security Symposium*, San Francisco, Calif., USA, Aug. 8-12, 2011, Proceedings. USENIX Association, 2011.

[48] Shai Halevi and Victor Shoup. Algorithms in HElib. In *CRYPTO* (1), volume 8616 of *Lecture Notes in Computer Science*, pages 554-571. Springer, 2014.

[49] Shai Halevi and Victor Shoup. Bootstrapping for HElib. In *EUROCRYPT* (1), volume 9056 of *Lecture Notes in Computer Science*, pages 641-670. Springer, 2015.

[50] Shai Halevi and Victor Shoup. HElib—An Implementation of homomorphic encryption. https://github.com/shaih/HElib/, Accessed September 2014.

[51] Shai Halevi. Homomorphic encryption. In *Tutorials on the Foundations of Cryptography*, pages 219-276. Springer International Publishing, 2017.

[52] Ryo Hiromasa, Masayuki Abe, and Tatsuaki Okamoto. Packing messages and optimizing bootstrapping in gsw-fhe. *IEICE TRANSACTIONS on Fundamentals of Electronics, Communications and Computer Sciences*, 99(1):73-82, 2016.

[53] Yuval Ishai and Anat Paskin. Evaluating branching programs on encrypted data. In *Theory of Cryptography Conference*, pages 575-594. Springer, 2007.

[54] Alhassan Khedr, P. Glenn Gulak, and Vinod Vaikuntanathan. SHIELD: scalable homomorphic implementation of encrypted data-classifiers. *IEEE Trans. Computers*, 65(9):2848-2858, 2016.

[55] Aggelos Kiayias, Nikos Leonardos, Helger Lipmaa, Kateryna Pavlyk, and Qiang Tang. Optimal rate private information retrieval from homomorphic encryption. *Proceedings on Privacy Enhancing Technologies*, 2015(2):222-243, 2015.

[56] Miran Kim, Yongsoo Song, Shuang Wang, Yuhou Xia, and Xiaoqian Jiang. Secure logistic regression based on homomorphic encryption. Cryptology ePrint Archive, Report 2018/074, 2018. https://eprint.iacr.org/2018/074.

[57] Demijan Klinc, Carmit Hazay, Ashish Jagmohan, Hugo Krawczyk, and Tal Rabin. On compression of data encrypted with block ciphers. *arXiv:*1009.1759 [*cs.IT*]

[58] Eyal Kushilevitz and Rafail Ostrovsky. Replication is not needed: Single database, computationally-private information retrieval. In *Foundations of Computer Science, 1997. Proceedings., 38th Annual Symposium on*, pages 364-373. IEEE, 1997.

[59] Julian D. Laderman. A noncommutative algorithm for multiplying 3×3 matrices using 23 multiplications. *Bull. Amer. Math. Soc.*, 82(1):126-128, 01 1976.

[60] Helger Lipmaa and Kateryna Pavlyk. A simpler rate-optimal cpir protocol. In *International Conference on Financial Cryptography and Data Security*, pages 621-638. Springer, 2017.

[61] Adriana Lopez-Alt, Eran Tromer, and Vinod Vaikuntanathan. On-the-fly multiparty computation on the cloud via multikey fully homomorphic encryption. In *STOC*, pages 1219-1234, 2012.

[62] Vadim Lyubashevsky, Chris Peikert, and Oded Regev. On ideal lattices and learning with errors over rings. *J. ACM*, 60(6):43, 2013. Early version in EUROCRYPT 2010.

[63] Vadim Lyubashevsky, Chris Peikert, and Oded Regev. A toolkit for ring-LWE cryptography. In Thomas Johansson and Phong Q. Nguyen, editors, *Advances in Cryptology—EUROCRYPT* 2013, pages 35-54. Springer, 2013.

[64] Daniele Micciancio and Chris Peikert. Trapdoors for lattices: Simpler, tighter, faster, smaller. In *EUROCRYPT*, volume 7237 of *Lecture Notes in Computer Science*, pages 700-718. Springer, 2012.

[65] Payman Mohassel and Yupeng Zhang. Secureml: A system for scalable privacy-preserving machine learning. In 2017 *IEEE Symposium on Security and Privacy, SP* 2017, San Jose, Calif., USA, May 22-26, 2017, pages 19-38. IEEE Computer Society, 2017.

[66] Michael Naehrig, Kristin Lauter, and Vinod Vaikuntanathan. Can homomorphic encryption be practical? In *Proceedings of the 3rd ACM workshop on Cloud computing security workshop*, pages 113-124. ACM, 2011.

[67] Femi Olumofin and Ian Goldberg. Revisiting the computational practicality of private information retrieval. In *International Conference on Financial Cryptography and Data Security*, pages 158-172. Springer, 2011.

[68] Emmanuela Orsini, Joop van de Pol, and Nigel P. Smart. Bootstrapping BGV ciphertexts with a wider choice of p and q. Cryptology ePrint Archive, Report 2014/408, 2014. http://eprint.iacr.org/.

[69] Pascal Paillier. Public-key cryptosystems based on composite degree residuosity classes. In *International Conference on the Theory and Applications of Cryptographic Techniques*, pages 223-238. Springer, 1999.

[70] Chris Peikert, Vinod Vaikuntanathan, and Brent Waters. A framework for efficient and composable oblivious transfer. In *Advances in Cryptology—CRYPTO* 2008, volume 5157 of *Lecture Notes in Computer Science*, pages 554-571. Springer, 2008.

[71] Oded Regev. On lattices, learning with errors, random linear codes, and cryptography. *J. ACM*, 56(6):34:1-34:40, 2009.

[72] Ronald L Rivest, Adi Shamir, and Leonard Adleman. A method for obtaining digital signatures and public-key cryptosystems. *Communications of the ACM*, 21(2):120-126, 1978.

[73] R. Rivest, L. Adleman, and M. Dertouzos. On data banks and privacy homomorphisms. In *Foundations of Secure Computation*, pages 169-177. Academic Press, 1978.

[74] Kurt Rohloff and David B. Cousins. A scalable implementation of fully homomorphic encryption built on NTRU. 2nd Workshop on Applied Homomorphic Cryptography and Encrypted Computing, WAHC'14, 2014. Available at haps://www.dcsec.uni-hannover.de/fileadmin/ful/mitarbeiter/brenner/wahc14_RC.pdf, accessed September 2014.

[75] Markku-Juhani Olavi Saarinen. Ring-lwe ciphertext compression and error correction: Tools for lightweight post-quantum cryptography. In *Proceedings of the 3rd ACM International Workshop on IoT Privacy, Trust, and Security*, pages 15-22. ACM, 2017.

[76] Patrick Schmid and Achim Roos. "aes-ni performance analyzed; limited to 32 nm core i5 cpus". https://www.tomshardware.com/reviews/clarkdale-aes-ni-encryption, 2538.html, accessed February 2019, 2010.

[77] Radu Sion and Bogdan Carbunar. On the practicality of private information retrieval. *In Proceedings of the Network and Distributed System Security Symposium, NDSS* 2007, San Diego, Calif., USA, 28 Feb.-2 Mar. 2007, 2007.

[78] Nigel P. Smart and Frederik Vercauteren. Fully homomorphic SIMD operations. *Des. Codes Cryptography*, 71(1):57-81, 2014. Early verion at http://eprint.iacr.org/2011/133.

[79] Julien P Stern. A new and efficient all-or-nothing disclosure of secrets protocol. In *International Conference on the Theory and Application of Cryptology and Information Security*, pages 357-371. Springer, 1998.

[80] Marten van Dijk, Craig Gentry, Shai Halevi, and Vinod Vaikuntanathan. Fully homomorphic encryption over the integers. In *Advances in Cryptology—EUROCRYPT*

2010, 29th Annual International Conference on the Theory and Applications of Cryptographic Techniques, French Riviera, May 30-Jun. 3, 2010. Proceedings, pages 24-43, 2010.

[81] Shuang Wang, Yuchen Zhang, Wenrui Dai, Kristin Lauter, Miran Kim, Yuzhe Tang, Hongkai Xiong, and Xiaoqian Jiang. Healer: homomorphic computation of exact logistic regression for secure rare disease variants analysis in gwas. *Bioinformatics,* 32(2):211-218, 2016.

[82] Chen Xu, Jingwei Chen, Wenyuan Wu, and Yong Feng. Homomorphically encrypted arithmetic operations over the integer ring. In Feng Bao, Liqun Chen, Robert H. Deng, and Guojun Wang, editors, *Information Security Practice and Experience,* pages 167-181, Cham, 2016. Springer International Publishing. https://ia.cr/2017/387.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   encrypting an index i, to be sent to a first computer system and by a second computer system, of an entry into a database stored by the first computer system, wherein the index i is represented in a mixed radix of $N_D$ bases and the database also has $N_D$ bases;
   requesting, by the second computer system, retrieval of an item from the first computer system using the encrypted index;
   receiving, by the second computer system and from the first computer system, a response to the request, the response comprising an encrypted answer, wherein the encrypted answer comprises one or more compressed ciphertexts corresponding to an entry in the database that was requested using the encrypted index; and
   decrypting, by the second computer system, the one or more compressed ciphertexts into corresponding plaintext, wherein the decrypting comprises decrypting the response comprising the one or more compressed ciphertexts to obtain a redundant encoding of the plaintext corresponding to the one or more compressed ciphertexts and noise, and using the redundancy of the redundant encoding to eliminate the noise and recover the plaintext corresponding to the one or more compressed ciphertexts.

2. The method of claim 1, wherein the mixed radix $N_D$ bases has index elements $(i_1, i_2, \ldots, i_D)$, wherein the database has N dimensions, $N=A \times B \times B \times \ldots \times B$, with $i_1 \in [A]$ and $i_j \in [B]$ for all $j>1$, and encrypting an index i comprises encrypting scalar $q' \cdot \sigma_{1,0}$ and $\sigma_{1,1}, \ldots, \sigma_{1,7}$ wherein $\sigma_{1,0}, \ldots \sigma_{1,7}$ are the bits of $i_1$, and for $j=2, \ldots, D$ encrypting ciphertexts to encrypt bits of a unit vector $e_{i_j}$, which is one in position and zero elsewhere, and where a ciphertext modulus of a ciphertext is a composite $Q=q \cdot q'$, with $q \approx 2^{46}$ and $q' 2^{60}$.

3. The method of claim 2, wherein encrypting an index i comprises the following:
   for a least significant bit, $\sigma_{1,0}$, of $i_1$ using an identity to multiple the least significant bit, and also multiplying the bit $\sigma_{1,0}$ by q';
   for the other bits of $i_1$, using a wide and short gadget matrix to multiply the other bits; and
   for the bits encoding the unary representation of the other $i_j$'s for $j>1$, using a somewhat rectangular gadget matrix to multiply the bits encoding the unary representation.

4. The method of claim 3, wherein the redundant encoding of the plaintext comprises some matrix that includes the plaintext, multiplied by a nearly square gadget matrix.

5. The method of claim 4, where for the nearly square gadget matrix, H, there exists another matrix F where F has full rank and entries much smaller than q, where q is a learning with errors modulus, and where H×F=0 mod q, where the entries of matrix F are small enough so that after the entries get multiplied by noise from ciphertext, a result is still smaller than q.

6. The method of claim 4, wherein:
   the decrypting is performed using a secret key;
   the secret key is a matrix of a form S=[S'|I], where S' is a learning with errors (LWE) secret;
   the some matrix that includes the plaintext is a matrix $$M' = \begin{bmatrix} 0 \\ M \end{bmatrix}$$

where M is the plaintext, so as to get SM'=M.

7. The method of claim 6, wherein the plaintext is an $n_0 \times n_0$ matrix M, and where the matrix M' is obtained from M by adding as many zero rows as a dimension of the learning with errors (LWE) secret, the dimension denoted by k, wherein, denoting $n_1=n_0+k$, the padded matrix M' has dimension $n_1 \times n_0$.

8. The method of claim 7, where the redundant encoding comprises multiplying M' on the right with the gadget matrix H of dimension $n_0 \times n_2$ results in a final dimension of a matrix of ciphertexts of $n_1 \times n_2$.

9. The method of claim 1, wherein the redundant encoding of the plaintext comprises some matrix that includes the plaintext, multiplied by an integer greater than one.

10. The method of claim 9, wherein:
    the decrypting is performed using a secret key;
    the secret key is a matrix of a form S=[S'|I], where S' is a learning with errors (LWE) secret;
    the some matrix that includes the plaintext is a matrix $$M' = \begin{bmatrix} 0 \\ M \end{bmatrix}$$

where M is the plaintext, so as to get SM'=M.

11. The method of claim 10, wherein the plaintext is an $n_0 \times n_0$ matrix M, and where the matrix M' is obtained from M by adding as many zero rows as a dimension of the learning with errors (LWE) secret, the dimension denoted by k, wherein, denoting $n_1=n_0+k$, the padded matrix M' has dimension $n_1 \times n_0$.

12. An apparatus, comprising:
    one or more memories having computer-readable code thereon; and
    one or more processors, the one or more processors, in response to retrieval and execution of the computer-readable code, causing a computer system to perform operations comprising:
    encrypting an index i, to be sent to a first computer system and by a second computer system, of an entry into a database stored by the first computer system, wherein the index i is represented in a mixed radix of $N_D$ bases and the database also has $N_D$ bases;
    requesting, by the second computer system, retrieval of an item from the first computer system using the encrypted index;
    receiving, by the second computer system and from the first computer system, a response to the request, the response comprising an encrypted answer, wherein the encrypted answer comprises one or more compressed ciphertexts corresponding to an entry in the database that was requested using the encrypted index; and
    decrypting, by the second computer system, the one or more compressed ciphertexts into corresponding plaintext, wherein the decrypting comprises decrypting the response comprising the one or more compressed ciphertexts to obtain a redundant encoding of the plaintext corresponding to the one or more compressed ciphertexts and noise, and using the redundancy of the redundant encoding to eliminate the noise and recover the plaintext corresponding to the one or more compressed ciphertexts.

13. The apparatus of claim 12, wherein the mixed radix $N_D$ bases has index elements $(i_1, i_2, \ldots, i_D)$, wherein the database has N dimensions, $N=A\times B\times B\times \ldots \times B$, with $i_i \in [A]$ and $i_j \in [B]$ for all $j>1$, and encrypting an index i comprises encrypting scalars $q'\cdot\sigma_{1,0}$ and $\sigma_{1,1}, \ldots, \sigma_{1,7}$ wherein $\sigma_{1,0}, \ldots \sigma_{1,7}$ are the bits of $i_1$, and for $j=2, \ldots, D$ encrypting ciphertexts to encrypt bits of a unit vector $e_{i_j}$, which is one in position $i_j$ and zero elsewhere, and where a ciphertext modulus of a ciphertext is a composite $Q=q\cdot q'$, with $q\approx 2^{46}$ and $q'\approx 2^{60}$.

14. The apparatus of claim 13, wherein encrypting an index i comprises the following:
for a least significant bit, $\sigma_{1,0}$, of $i_1$ using an identity to multiple the least significant bit, and also multiplying the bit $\sigma_{1,0}$ by $q'$;
for the other bits of $i_1$, using a wide and short gadget matrix to multiply the other bits; and
for the bits encoding the unary representation of the other $i_j$'s for $j>1$, using a somewhat rectangular gadget matrix to multiply the bits encoding the unary representation.

15. The apparatus of claim 14, wherein the redundant encoding of the plaintext comprises some matrix that includes the plaintext, multiplied by a nearly square gadget matrix.

16. The apparatus of claim 15, where for the nearly square gadget matrix, H, there exists another matrix F where F has full rank and entries much smaller than q, where q is a learning with errors modulus, and where $H\times F=0 \mod q$, where the entries of matrix F are small enough so that after the entries get multiplied by noise from ciphertext, a result is still smaller than q.

17. The apparatus of claim 15, wherein:
the decrypting is performed using a secret key;
the secret key is a matrix of a form $S=[S'|I]$, where $S'$ is a learning with errors (LWE) secret;
the some matrix that includes the plaintext is a matrix $$M' = \begin{bmatrix} 0 \\ \hline M \end{bmatrix}$$

where M is the plaintext, so as to get $SM'=M$.

18. The apparatus of claim 17, wherein the plaintext is an $n_0 \times n_0$ matrix M, and where the matrix M' is obtained from M by adding as many zero rows as a dimension of the learning with errors (LWE) secret, the dimension denoted by k, wherein, denoting $n_1=n_0+k$, the padded matrix M' has dimension $n_1 \times n_0$.

19. The apparatus of claim 12 wherein the redundant encoding of the plaintext comprises some matrix that includes the plaintext, multiplied by an integer greater than one.

20. The apparatus of claim 19, wherein:
the decrypting is performed using a secret key;
the secret key is a matrix of a form $S=[S'|I]$, where $S'$ is a learning with errors (LWE) secret;
the some matrix that includes the plaintext is a matrix $$M' = \begin{bmatrix} 0 \\ \hline M \end{bmatrix}$$

where M is the plaintext, so as to get $SM'=M$.

21. A computer program product comprising a non-transitory computer readable storage medium having program instructions embodied therewith, the program instructions executable by a computer system to cause the computer system to perform operations comprising:
encrypting an index i, to be sent to a first computer system and by a second computer system, of an entry into a database stored by the first computer system, wherein the index i is represented in a mixed radix of $N_D$ bases and the database also has $N_D$ bases;
requesting, by the second computer system, retrieval of an item from the first computer system using the encrypted index;
receiving, by the second computer system and from the first computer system, a response to the request, the response comprising an encrypted answer, wherein the encrypted answer comprises one or more compressed ciphertexts corresponding to an entry in the database that was requested using the encrypted index; and
decrypting, by the second computer system, the one or more compressed ciphertexts into corresponding plaintext, wherein the decrypting comprises decrypting the response comprising the one or more compressed ciphertexts to obtain a redundant encoding of the plaintext corresponding to the one or more compressed ciphertexts and noise, and using the redundancy of the redundant encoding to eliminate the noise and recover the plaintext corresponding to the one or more compressed ciphertexts.

* * * * *